United States Patent
Ikki et al.

(10) Patent No.: US 8,578,791 B2
(45) Date of Patent: Nov. 12, 2013

(54) SENSOR-EQUIPPED BEARING FOR WHEEL

(75) Inventors: Kentaro Ikki, Iwata (JP); Takayuki Norimatsu, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 236 days.

(21) Appl. No.: 13/067,134

(22) Filed: May 11, 2011

(65) Prior Publication Data

US 2011/0214513 A1    Sep. 8, 2011

Related U.S. Application Data

(63) Continuation of application No. PCT/JP2009/005971, filed on Nov. 10, 2009.

(30) Foreign Application Priority Data

Nov. 17, 2008   (JP) ................................ 2008-293050
Nov. 27, 2008   (JP) ................................ 2008-302297

(51) Int. Cl.
*G01L 1/22*        (2006.01)

(52) U.S. Cl.
USPC ................................ 73/862.045; 73/862.322

(58) Field of Classification Search
USPC ........................ 73/862.041–862.045, 862.322
See application file for complete search history.

(56) References Cited

U.S. PATENT DOCUMENTS

| | | | |
|---|---|---|---|
| 7,216,551 B2 | 5/2007 | Koyagi et al. | |
| 7,661,320 B2 | 2/2010 | Duret et al. | |
| 7,856,893 B2 * | 12/2010 | Ozaki et al. | 73/862.321 |
| 8,123,411 B2 | 2/2012 | Norimatsu et al. | |
| 8,313,242 B2 * | 11/2012 | Norimatsu et al. | 384/448 |
| 8,393,793 B2 * | 3/2013 | Isobe et al. | 384/448 |
| 8,397,590 B2 | 3/2013 | Ozaki et al. | |
| 2006/0061352 A1 | 3/2006 | Koyagi et al. | |
| 2009/0044633 A1 | 2/2009 | Duret et al. | |
| 2009/0301222 A1 * | 12/2009 | Takahashi et al. | 73/862.044 |
| 2010/0046871 A1 * | 2/2010 | Norimatsu et al. | 384/448 |
| 2010/0135604 A1 | 6/2010 | Ozaki et al. | |

FOREIGN PATENT DOCUMENTS

| | | |
|---|---|---|
| CN | 1748091 A | 5/2006 |
| CN | 101305271 A | 11/2008 |
| JP | 2007-057299 | 3/2007 |

(Continued)

OTHER PUBLICATIONS

U.S. Appl. No. 12/450,442, filed Sep. 25, 2009, Norimatsu et al., NTN Corporation.

(Continued)

*Primary Examiner* — Max Noori

(57) ABSTRACT

A sensor equipped wheel support bearing assembly, in which the load imposed on the wheel support bearing assembly or a tire tread of a wheel tire can be accurately detected without being affected by the rolling elements, includes rolling elements interposed between plural opposed rolling surfaces defined in outer and inner members. One of the outer and inner members that serves as a stationary member is provided with one or more sensor unit. The sensor unit includes a strain generating member, having two or more contact fixing segments fixed to the stationary member, and a sensor for detecting such strain. The strain generating member in the sensor unit is arranged at a position departing from a line passing through a center of the rolling elements and extending in a direction defined by the rolling element contact angle.

10 Claims, 23 Drawing Sheets

(56) References Cited

FOREIGN PATENT DOCUMENTS

| JP | 2008-185496 | 8/2008 |
| JP | 2008-185497 | 8/2008 |
| JP | 2008-249566 | 10/2008 |
| JP | 2008-249615 | 10/2008 |
| WO | 2008/117534 A1 | 10/2008 |

OTHER PUBLICATIONS

U.S. Appl. No. 11/990,071, filed Feb. 6, 2008, Ozaki et al., NTN Corporation.

International Search Report for PCT/JP2009/005971, mailed Jan. 26, 2010.

International Preliminary Report on Patentability mailed Jun. 30, 2011 in corresponding International Patent Application PCT/JP2009/005971.

Chinese Office Action issued Nov. 27, 2012 in corresponding Chinese Patent Application 200980145679.0.

Japanese Office Action mailed Jan. 15, 2013 in corresponding Japanese Application No. 2008-293050.

Chinese Office Action issued May 29, 2013 in corresponding Chinese Patent Application No. 200980145679.0.

\* cited by examiner

OUTBOARD SIDE ← → INBOARD SIDE

OUTBOARD SIDE → ← INBOARD SIDE

OUTBOARD SIDE ← → INBOARD SIDE

SENSOR-EQUIPPED BEARING FOR WHEEL

CROSS REFERENCE TO THE RELATED APPLICATIONS

This application is a continuation application, under 35 U.S.C. §111(a), of international application No. PCT/JP2009/005971, filed Nov. 10, 2009, which claims priority to Japanese patent applications No. 2008-293050, filed Nov. 17, 2008, and No. 2008-302297, filed Nov. 27, 2008, the disclosure of which are incorporated by reference in their entirety into this application.

BACKGROUND OF THE INVENTION

1. Field of the Invention

The present invention relates to a sensor equipped wheel support bearing assembly having a load sensor incorporated therein for detecting a load imposed on a bearing assembly.

2. Description of Related Art

As a technique for detecting a load acting on each of vehicle wheels, a sensor equipped wheel support bearing assembly has been suggested, in which a sensor unit made up of a strain generating member and a strain sensor fitted to the strain generating member is fitted to a stationary ring of the bearing assembly and this strain generating member is of a kind having at least two contact fixing segments which are to be fixed to the stationary member and also having a cutout portion at at least one location between the neighboring contact fixing segments with the strain sensor disposed in this cutout portion (such as disclosed in the Patent Document 1 listed below).

According to the sensor equipped wheel support bearing assembly of the type referred to above, when a load is imposed on a rotatable ring incident to the travel of an automotive vehicle, the stationary ring deforms through rolling elements and such deformation brings about a strain in the sensor unit. The strain sensor provided in the sensor unit detects the strain induced in the sensor unit. If relations between strains and loads are determined beforehand by means of a series of experiments and/or simulations, the load or the like imposed on a vehicle wheel can be detected from an output of the strain sensor.

PRIOR ART DOCUMENTS

JP Laid-open Patent Publication No. 2007-057299

SUMMARY OF THE INVENTION

It has, however, been found that in the sensor equipped wheel support bearing assembly of the type discussed above, each time the rolling elements move past the vicinity of the site of installation of the sensor unit, the stationary ring is deformed by the effect of rolling element loads, resulting in an increase of the amplitude of an output signal of the sensor unit. In other words, the output signal of the sensor unit represents a periodic waveform affected by the influence brought about the rolling element, and, therefore, the load cannot be detected precisely.

An object of the present invention is to provide a sensor equipped wheel support bearing assembly of a kind in which the load imposed on the wheel support bearing assembly or a tire tread of a wheel tire can be accurately detected without being affected by the rolling elements.

The sensor equipped wheel support bearing assembly designed in accordance with the present invention is a wheel support bearing assembly for rotatably supporting a vehicle wheel relative to a vehicle body structure, which includes an outer member having an inner periphery formed with a plurality of rolling surfaces, an inner member having an outer periphery formed with rolling surfaces held in face-to-face relation with the respective rolling surfaces, and a plurality of rows of rolling elements interposed between the opposed rolling surfaces; and at least one sensor unit including a strain generating member, having two or more contact fixing segments adapted to be held in contact with and fixed to one of the outer and inner members that serves as a stationary member, and a sensor mounted on the strain generating member for detecting a strain occurred in the strain generating member, in which the strain generating member is disposed at a location departing from a line that passes through a center of the rolling elements and extends in a direction defined by a rolling element contact angle. In other words, the sensor unit is provided so as to be arranged in its entirety at a position departing from a line extending in the direction defined by the rolling element contact angle. The stationary member referred to above may be, for example, the outer member. The sensor unit may be provided in a plural number.

The stationary member undergoes deformation by the effect of the load of the rolling elements then moving. In particular, on the line passing through the center of the rolling elements and extending in the direction defined by the rolling element contact angle, the deformation by the effect of the rolling elements is considerable. In other words, it is apt to be affected by the influence brought about by the rolling element load. In this sensor equipped wheel support bearing assembly, the sensor unit is provided in the stationary member so as to permit the strain generating member to assume a position departing from the line passing through the center of the rolling elements in the direction in which the rolling element contact angle is formed, the strain generating member of the sensor unit is hardly affected by the rolling element load. Accordingly, deformation of the stationary member by the effect of the original load can be precisely detected by the sensor unit and, from the output signal thereof, the load acting between the vehicle wheel and the wheel tire can be accurately detected.

In one embodiment of the present invention, the strain generating member of the sensor unit may be axially disposed at a position axially intermediate of the plurality of rows of the rolling elements.

Disposition of the sensor unit so as to assume the position axially intermediate of the plurality of rows of the rolling elements is effective to allow the strain generating member to be positioned at a location most distant from any one of the rows of the rolling elements and, therefore, the influence which may be brought about by the rolling element load can be eliminated, allowing the load to be accurately detected.

In one embodiment of the present invention, the sensor units may be disposed at upper, lower, right and left surface areas of the outer diametric surface of the stationary member, which correspond respectively to top, bottom, forward and rearward positions relative to a tire tread of a vehicle wheel tire. In the case of the construction described above, the load acting in a plurality of directions can be estimated. In other words, from the respective output signals of the two sensor units disposed at the upper and lower surface areas of the outer diametric surface of the stationary member, the vertically oriented load Fz and the axially oriented load Fy can be estimated while from the respective output signals of the two sensor units disposed at the right and left surface areas of the outer diametric surface of the stationary member, the load Fx resulting from the driving force or the braking force can be estimated.

In one embodiment of the present invention, the strain generating member in the sensor unit may be in the form of a thin plate of a generally strip shape, when viewed from top, and has a cutout portion defined in a side edge portion thereof. In the case of this construction described above, the strain occurring in the stationary member is apt to be transmitted to the strain generating member after having been amplified, such strain can be detected by the sensor with a high sensitivity, the hysteresis occurring in the output signal thereof can be reduced and the load can thus be estimated accurately. Also, the shape of the strain generating member can become simplified, compact and at a low cost.

In one embodiment of the present invention, the strain generating member in the sensor unit may be of a kind unable to undergo a plastic deformation even under a condition, in which as an external force acting on the outer member serving the stationary member or a working force acting between a vehicle wheel tire and the road surface, the expected maximum force is applied. The expected maximum force referred to above means the highest force within the range in which, even when an excessive load is imposed on the bearing unit, the normal function of the wheel support bearing assembly except for the sensor system will be restored once such excessive force is removed. Since when the plastic deformation occurs, deformation of the outer member will not be transmitted to the outer member and measurement of the strain is adversely affected accordingly, it is desirable that the strain generating member be of a kind unable to undergo the plastic deformation even when the expected maximum force is applied.

In one embodiment of the present invention, the sensor equipped wheel support bearing assembly of the present invention may further include a correcting section for correcting an output signal of the sensor in the sensor unit and an estimating section for estimating a load, acting on a tire tread of a vehicle wheel tire, or a load, acting on the wheel support bearing assembly, from the output signal which has been corrected by the correcting section. For example, the rolling element position detecting device for detecting the position of the rolling elements may be provided in the stationary member and, as one of the correcting section referred to previously, means may be provided for correcting the output signal of the sensor in the sensor unit in dependence on the detection output of the rolling element position detecting device.

As hereinabove described, if the position at which the sensor unit is disposed is carefully and properly selected, the output signal of the sensor unit can reduce the influence which may be brought by the rolling elements, but such influence still remains. The output signal of the sensor unit in such case will have its amplitude periodically changing at intervals of the pitch of arrangement of the rolling elements. In view of this, if, for example, the rolling element position detecting device for detecting the position of rotation of the rolling elements is separately employed and, for the correcting section, the type capable of correcting the amplitude of the output signal of the sensor unit to increase or decrease in dependence on the rolling element position detected by the rolling element position detecting device is employed, the influence brought about by the position of the rolling elements can be eliminated.

In one embodiment of the present invention, the sensor equipped wheel support bearing assembly of the present invention may still include an axially oriented load direction determining device for determining a direction of an axially oriented load acting in a direction axially of the wheel support bearing assembly or a vehicle wheel tire, the axially oriented load direction determining device comprising an L-shaped strain generating member, having two pieces, one of the pieces being fitted to a stationary side raceway ring and the other being fitted to a flange of the stationary side raceway ring, and a sensor fitted to the L-shaped strain generating member for detecting a strain induced in this strain generating member.

Where the axially oriented load is to be estimated from the output signal of the sensor unit, it may happen that the direction thereof cannot be determined. Accordingly, by employing the axially oriented load direction determining device for determining the direction of the axially oriented load separate from the sensor unit, the axially oriented load can be accurately estimated. Where for the axially oriented load direction determining device, the use is made of the L-shaped strain generating member, the direction of the load can be effectively determined.

In one embodiment of the present invention, the strain generating member in the sensor unit may be axially arranged at a position on an inboard side of one of the plurality of the rows of the rolling elements that lies on the inboard side.

In one embodiment of the present invention, the sensor unit may be provided in three or more in number, in which case the sensor equipped wheel support bearing assembly of the present invention includes an estimating section for estimating from respective output signals of the sensors in those sensor units, a radially oriented load, acting in a direction radially of the wheel support bearing assembly or the vehicle wheel tire, or an axially oriented load acting in a direction axially of the wheel support bearing assembly or the vehicle wheel tire. The use of the three or more sensor units makes it possible to increase the load estimating accuracy.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Hereinafter, a first embodiment of the present invention will be described in detail with particular reference to FIGS. 1 to 4. This first embodiment is applied to a wheel support bearing assembly of an inner ring rotating model of the third generation type used to rotatably support a vehicle drive wheel. It is to be noted that in the specification as herein set forth, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
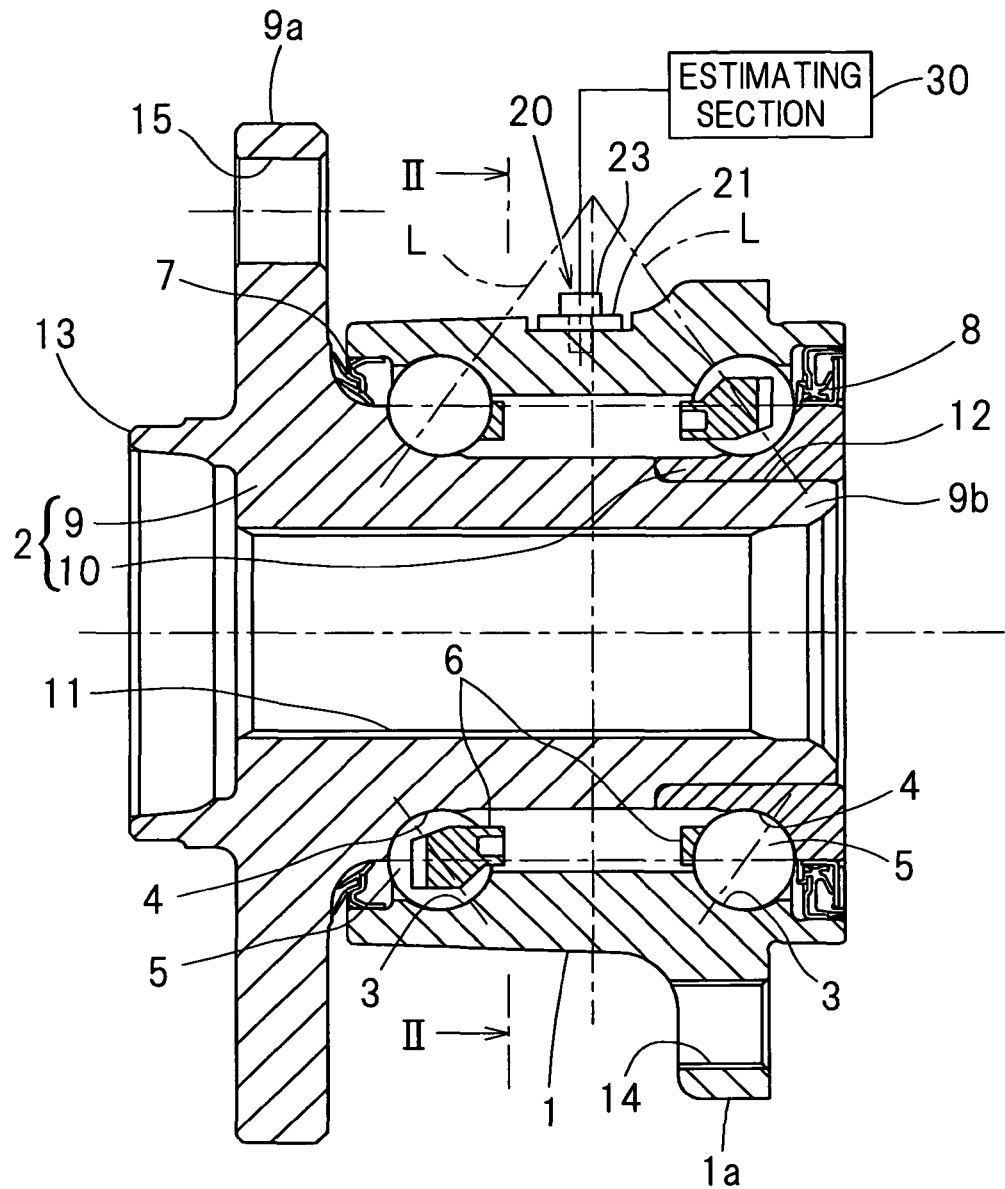
FIG. 1 is a diagram illustrating a sectional view of a sensor equipped wheel support bearing assembly according to a first embodiment of the present invention shown together with a block diagram of a conceptual construction of a detecting system thereof.
Figure 1:
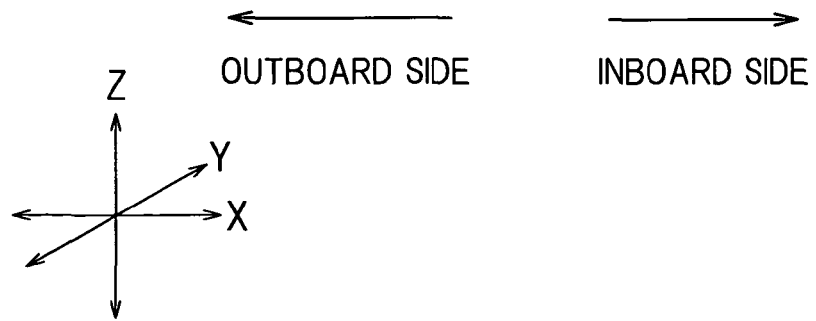

The bearing unit employed in this sensor equipped wheel support bearing assembly includes, as best shown in FIG. 1 in a sectional representation, an outer member 1 having an inner periphery formed with a plurality of rolling surfaces 3, an inner member 2 having an outer periphery formed with rolling surfaces 4 held in face-to-face relation with the rolling surfaces 3 referred to above, and a plurality of, for example, double rows of rolling elements 5 interposed between the respective rolling surfaces 3 and 4 in the outer and inner members 1 and 2. This wheel support bearing assembly is rendered to be a double angular contact ball bearing type, in which the rolling elements 5 are in the form of balls that are retained by a retainer 6 employed for each of the rows of those rolling elements 5. The rolling surfaces 3 and 4 are of an arcuately sectioned shape and are so formed as to represent respective rolling element contact angles that are held in back-to-back relation with each other. Opposite open ends of an annular bearing space delimited between the outer member 1 and the inner member 2 are sealed respectively by outboard and inboard sealing units 7 and 8.

The outer member 1 serves as a stationary member and is of one-piece construction having an outer periphery formed with a vehicle body fitting flange 1a that is secured to a knuckle (not shown) forming a part of the automobile suspension system mounted on the automotive body structure. The flange 1a is provided with vehicle body fitting screw holes 14 at respective locations spaced in a direction circumferentially thereof, and when knuckle bolts (not shown) inserted through corresponding bolt insertion holes in the knuckle from the inboard side are threaded into the respective screw holes 14, the vehicle body fitting flange 1a is fitted to the knuckle.

The inner member 2 serves as a rotating member and is made up of a hub axle 9 having a wheel mounting hub flange 9a, and an inner ring 10 mounted on an outer periphery of an inboard end of an axle portion 9b of the hub axle 9. The raceways 4 one for each row are formed in the hub axle 9 and the inner ring 10, respectively. The inboard end of the hub axle 9 has its outer periphery provided with an inner ring mounting surface 12 which is radially inwardly stepped to have a small diameter, and the inner ring 10 referred to above is mounted on this inner ring mounting surface 12. The hub axle 9 has a center bore 11 defined therein so as to extend therethrough in a direction axially thereof. The hub flange 9a is provided with a plurality of press-fitting holes 15 defined at respective locations circumferentially thereof for receiving corresponding hub bolts (not shown). At a portion of the hub axle 9 adjacent the root of the hub flange 9a, a cylindrical pilot portion 13 for guiding a vehicle wheel and brake component parts (both not shown) protrudes towards the outboard side.

Figure 2:
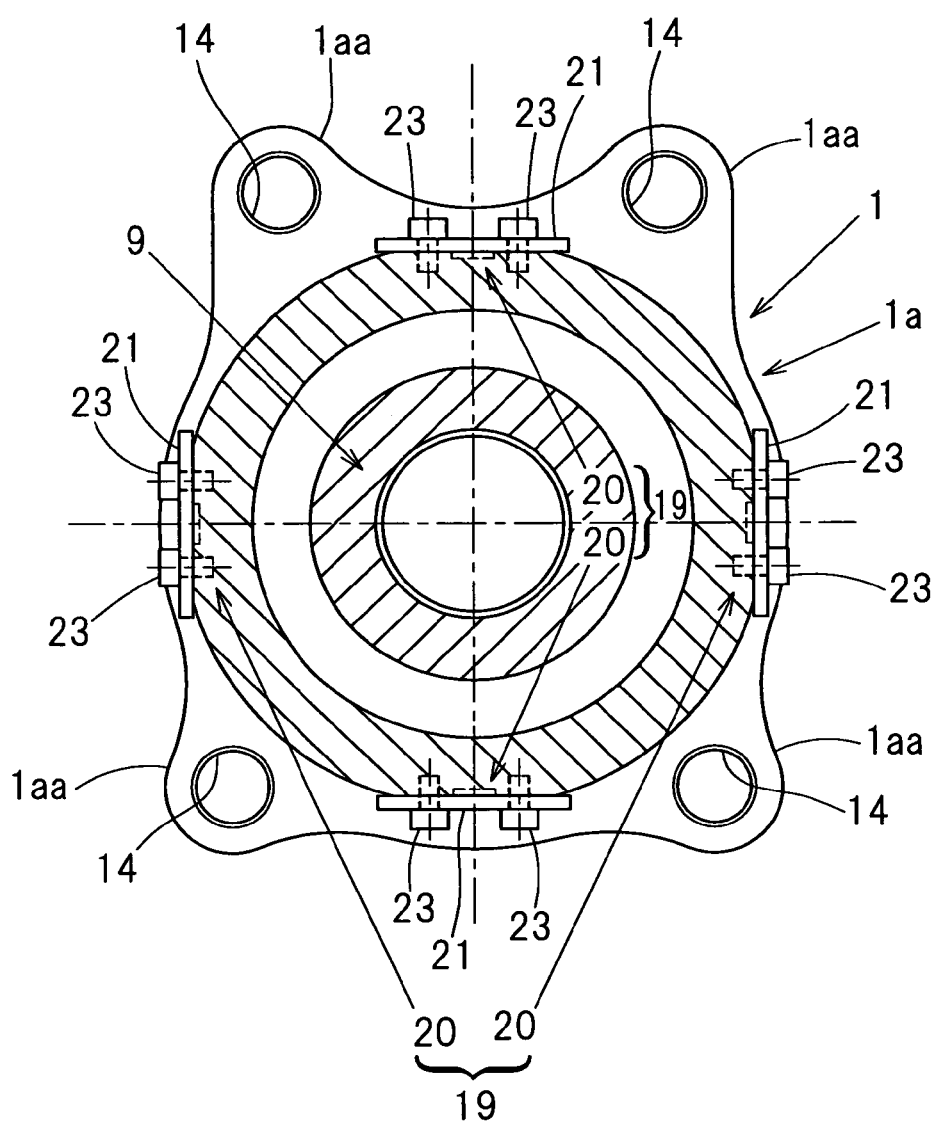
FIG. 2 is a cross sectional view taken along the line II-II in FIG. 1.

FIG. 2 illustrates a cross sectional representation taken along the line II-II in FIG. 1. The vehicle body fitting flange 1a integral with the outer member 1 is of a structure, in which respective circumferential portions of such flange 1a, where the screw holes 14 referred to previously are defined, are formed as projections 1aa protruding radially outwardly thereof, beyond the remaining portion thereof. As best shown therein, the outer diametric surface of the outer member 1 serving as the stationary member is provided with two sets of sensor unit pair 19, each pair comprises of two sensor units 20. The two sensor units 20 forming the respective sensor unit pair 19 are disposed at respective positions on the circumferential portions of the outer diametric surface of the outer member 1, which are spaced 180° in phase difference from each other in a direction circumferentially thereof. In the embodiment shown therein, in addition to one set of the sensor unit pair 19 comprised of the two sensor units 20 that are disposed at upper and lower surface areas of the outer diametric surface of the outer member 1, which corresponds to top and bottom positions relative to a tire tread of the vehicle tire, another set of the sensor unit pairs 19 comprised of the two sensor units 20 that are disposed at right and left surface areas of the outer diametric surface of the outer member 1, which corresponds to the forward and rearward positions relative to the tire tread of the vehicle tire, are employed.

Positioning of the two sensor units 20, forming the sensor unit pair 19, at the upper and lower surface areas of the outer diametric surface of the outer member 1, which correspond respectively to the top and bottom positions relative to the tire tread of the vehicle tire, makes it possible to detect a load Fz acting on the wheel support bearing assembly in a vertical direction. On the other hand, positioning of the two sensor units 20, forming the sensor unit pair 19, at the right and left surface areas of the outer diametric surface of the outer member 1, which correspond respectively to the forward and rearward positions relative to the tire tread of the vehicle tire, makes it possible to detect a load Fx which acts as a driving force or a braking force. Regarding the sensor unit pair 19 used to detect the load Fz acting in the vertical direction, one of the sensor units 20 is disposed at a location intermediate between the neighboring two projections 1aa, which are located in an upper portion of the outer diametric surface of the outer member 1, and the other of the sensor units 20 is disposed at a location intermediate between the neighboring two projections 1aa, which are located in a lower portion of the outer diametric surface of the outer member 1.

Figure 3A:
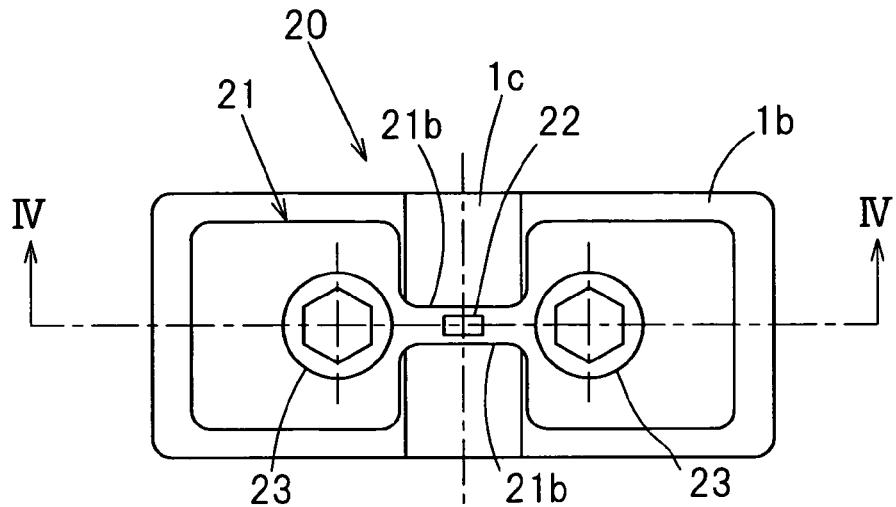
FIG. 3A is an enlarged sectional view showing the manner of fitting of a sensor unit in the sensor equipped wheel support bearing assembly.
Figure 3B:
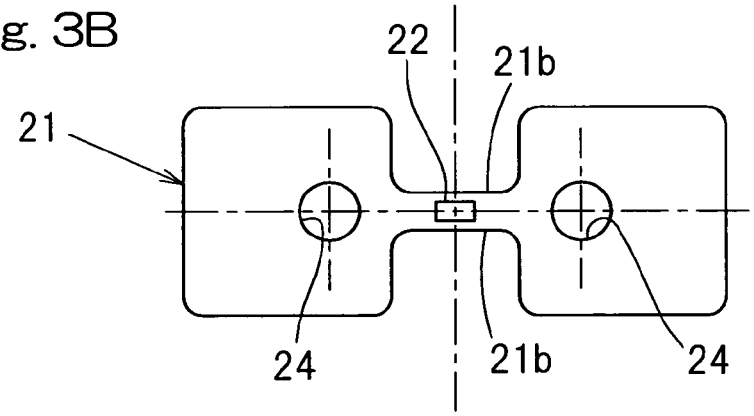
FIG. 3B is an enlarged top plan view of the sensor unit.
Figure 4:
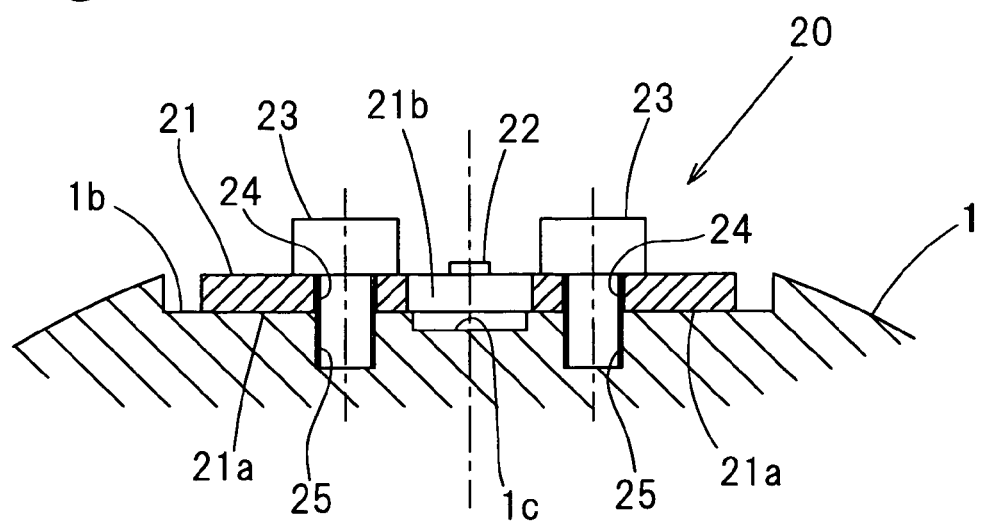
FIG. 4 is a cross sectional view taken along the line IV-IV in FIG. 3A.

Each of those sensor units 20 is, as best shown in FIG. 3A in an enlarged top plan view and also in FIG. 4 in an enlarged sectional view, made up of a strain generating member 21 and a strain sensor 22 fitted to this strain generating member 21 for detecting a strain induced in the strain generating member 21. The strain generating member 21 is prepared from a thin plate made of an elastically deformable metallic material such as, for example, a steel material and having a thickness smaller than 2 mm, and is of a generally strip shape, when viewed from top, having a uniform width over the entire length thereof with cutout portions 21b formed at respective intermediate portions of opposite side edge portions thereof. Each of the cutout portions 21b has corner portions each so shaped as to represent an arcuately sectioned shape. Also, as best shown in FIG. 4, the strain generating member 21 has its opposite ends provided with corresponding contact fixing segments 21a that are fixed to the outer diametric surface of the outer member 1 in contact therewith. It is to be noted that depending on the shape of the strain generating member 21, the strain generating member may have more than two contact fixing segments 21a. The strain sensor 22 is pasted to a portion of the strain generating member 21 where the strain occurs largely relative to a load acting in various directions. In the instance as shown, for that portion of the strain generating member 21, a portion of an outer surface of the strain generating member 21 intermediate between the cutout portions 21b on the respective side edge portions thereof is chosen such that the strain sensor 22 can detects the strain acting in the vicinity of the cutout portions 21b in the circumferential direction. It is to be noted that the strain generating member 21 is preferably of a kind unable to undergo a plastic deformation even under a condition, in which as an external force acting on the outer member 1 serving the stationary member or a working force acting between a vehicle wheel tire and the road surface, the expected maximum force is applied. That is because if the plastic deformation occurs, deformation of the outer member 1 will not be transmitted to the outer member 1 and measurement of the strain is adversely affected accordingly. The expected maximum force referred to above means the largest force within the range in which, even when an excessive load is imposed on the bearing unit, the normal function of the wheel support bearing assembly except for the sensor system will be restored once such excessive force is removed. In other words, it means the largest force within the range in which the normal functioning of the bearing unit except for the sensor system will not be impaired by the load imposed on the bearing unit.

As best shown in FIG. 1, each of the sensor units 20 is so provided on the outer diametric surface of the outer member 1 that the associated strain generating member 21 may assume the position departing from any of the single dotted chain lines L passing through centers of the rolling elements and extending in respective directions, which are defined by respective rolling element contact angles. In such case, the sensor unit 20 in its entirety is disposed at a position departing from the lines L. In the instance as shown, the sensor unit 20 is provided on the outer diametric surface of the outer member 1 so that the corresponding strain generating member 21 may assume the position slightly offset on the outboard side with respect to the intermediate point between the double rows of the rolling elements 5 in the axial direction.

Also, as best shown in FIG. 4, the sensor units 20 are so arranged that the two contact fixing segments 21a of the strain generating member 21 may be held at the same axial position of the outer member 1, but spaced from each other in the circumferential direction thereof, with those contact fixing segments 21a fixed to the outer diametric surface of the outer member 1 by means of the respective bolts 23. The bolts 23 are, after having been passed through the corresponding bolt insertion holes 24 defined in the respective contact fixing segments 21a so as to extend in the radial direction thereof, threaded into the screw holes 25 defined in an outer peripheral portion of the outer member 1. In order to increase the stability of each of the sensor unit 20 on the outer diametric surface of the outer member 1, respective portions of the outer diametric surface of the outer member 1, to which the two contact fixing segments 21a of the strain generating member 21 are fixed in contact therewith, are formed with corresponding flat surface areas 1b. Also, a portion of the outer diametric surface of the outer member 1, which lies intermediate between two locations where the two contact fixing segments 21a of the strain generating member 21 are fixed to the outer diametric surface of the outer member 1, is formed with a groove 1c.

As hereinabove described, formation of the groove 1c at that portion of the outer diametric surface of the outer member 1, which lies intermediate between those two locations where the two contact fixing segments 21a are fixed to the outer diametric surface of the outer member 1, is effective to separate the intermediate portion of the strain generating member 21 in the form of a thin plate, which is bound between the cutout portions 21b, from the outer diametric surface of the outer member 1 when such strain generating member 21 is fixed to the outer diametric surface of the outer member 1 by means of the bolts 23 in the manner described previously, thus allowing the strain induced deformation of the vicinity of the cutout portions 21b to be facilitated.

For the strain sensor 22, any of various types may be employed. For example, the strain sensor 22 may be employed in the form of a metal foil strain gauge. In such case, fixture thereof to the strain generating member 21 is generally carried out by means of a bonding technique. Also, the strain sensor 22 may be employed in the form of a thick film resistance element formed on the strain generating member 21.

The strain sensor 22 in each of the sensor units 20 is connected with an estimating section 30 as shown in FIG. 1. This estimating section 30 is operable to estimate a working force acting between the vehicle wheel tire and the road surface (a radially acting load acting in a radial direction of the vehicle wheel tire or the wheel support bearing assembly or an axially acting load acting in an axial direction of the vehicle wheel tire or the wheel support bearing assembly) from an output signal of the strain sensor 22 and includes, for example, a signal processing circuit and a correcting circuit. The estimating section 30 has a relation setting circuit (not shown) for setting relations between the working force, acting between the vehicle wheel tire and the road surface, and the output signal of the strain sensor 22 in terms of, for example, calculating equations and/or tables, so that the working force can be outputted from the inputted output signal of the strain sensor 22, after having made reference to the relation setting circuit. The contents of the relation setting circuit are prepared therein after having determined by means of a series of experiments and/or simulations before they are set in the relation setting circuit.

When a load acts between the vehicle wheel tire and the road surface, such load is applied to the outer member 1, which is the stationary member of the wheel support bearing assembly, accompanied by deformation of the outer member 1. Since the two contact fixing segments 21a of the strain generating member 21, which forms a part of the sensor unit 20, are fixed to the outer diametric surface of the outer member 1 in contact therewith, the strain appearing in the outer member 1 can be transmitted to the strain generating member 21 after having been amplified, wherefore such strain is detected by the strain sensor 22 and the load is then estimated from such output signal.

Also, since the contact fixing segments 21a of the strain generating member 21, which forms a part of the sensor unit 20, are fixed to the outer member 1 serving as the stationary member by means of the bolts 23, no slip occurring between the outer member 1 and the sensor unit 20 can be suppressed, thereby avoiding a noise in the output signal of the strain sensor 22 incident to the slippage.

As hereinbefore discussed under the heading of "Description of Related Arts", the outer member 1 tends to deform by the effect of a load of the rolling elements 5 then moving. Such deformation caused by the effect of the load of the moving rolling elements 5 is significant particularly on the line L (FIG. 1) passing through a center of the rolling elements 5 and extending in a direction defined the rolling element contact angle. In other words, it tends to be easily affected by the influence brought about by the rolling element load. However, in the sensor equipped wheel support bearing assembly of the structure designed in accordance with the first embodiment described hereinabove, the strain generating member 21 in each of the sensor unit 20 is so disposed on the outer diametric surface of the outer member 1 as to assume the position departing from the lines L passing through the centers of the rolling elements 5 and extending in a direction defined by the rolling element contact angles. Therefore, the strain generating member 21 in each of the sensor units 2 is hardly affected by the influence brought about by the rolling element load. This in turn leads to accurate detection of the deformation, occurring in the outer member 1 by the effect of the original load, with the associated sensor unit 20. The estimating section 30 referred to previously accurately estimate from an output signal thereof, the load acting between the vehicle wheel tire and the road surface.

Although in the foregoing description, reference has been made to the detection of the working force between the vehicle wheel tire and the road surface, not only the working force between the vehicle wheel tire and the road surface, but a force acting on the wheel support bearing assembly (for example, a preload amount) may be detected.

When the detected load obtained from this sensor equipped wheel support bearing assembly is utilized in controlling the automotive vehicle, contribution can be made to a stabilized travel of the automotive vehicle. Also, when this sensor equipped wheel support bearing assembly is used, the load sensor can be snugly and neatly installed in the automotive vehicle and an excellent mass-production can be accomplished, accompanied by a reduction in cost.

In addition, since in the case of the previously described first embodiment, the strain generating member 21 in each of the sensor units 20 is in the form of the thin plate of a generally strip shape, when viewed from top, having an uniform width over the entire length thereof and also having the cutout portions 21b defined in the opposite side edge portions thereof, the strain occurring in the outer member 1 can be easily transmitted to the strain generating member 21 after having been amplified, such strain can be detected by the corresponding strain sensor 22 with a high sensitivity, the hysteresis occurring in the output signal thereof can be reduced and the load can be accurately estimated. Also, the shape of the strain generating member 21 can be simplified and can be made compact and at a low cost, and it can become excellent in mass productivity.

Furthermore, since in the previously described first embodiment, the two sets of sensor unit pair 19 are provided with each set being comprised of the two sensor units 20, which are disposed on the outer diametric surface of the outer member 1 serving as the stationary member, at the respective positions spaced 180° in phase difference in the circumferential direction, the load can be accurately estimated even under any load conditions. In other words, when the load in a certain direction is large, a portion, at which the rolling elements 5 and the rolling surfaces 3 and 4 contact with each other, and a portion, at which the rolling elements 5 and the rolling surfaces 3 and 4 do not contact with each other, appear in 180° phase difference. Accordingly, if the sensor units 20 are installed 180° phase difference to suit to such direction, the load applied to the outer member 1 through the rolling elements 5 can be by necessity transmitted to either one of the sensor units 20 and, therefore, such load can be detected by the strain sensor 22.

Figure 5:
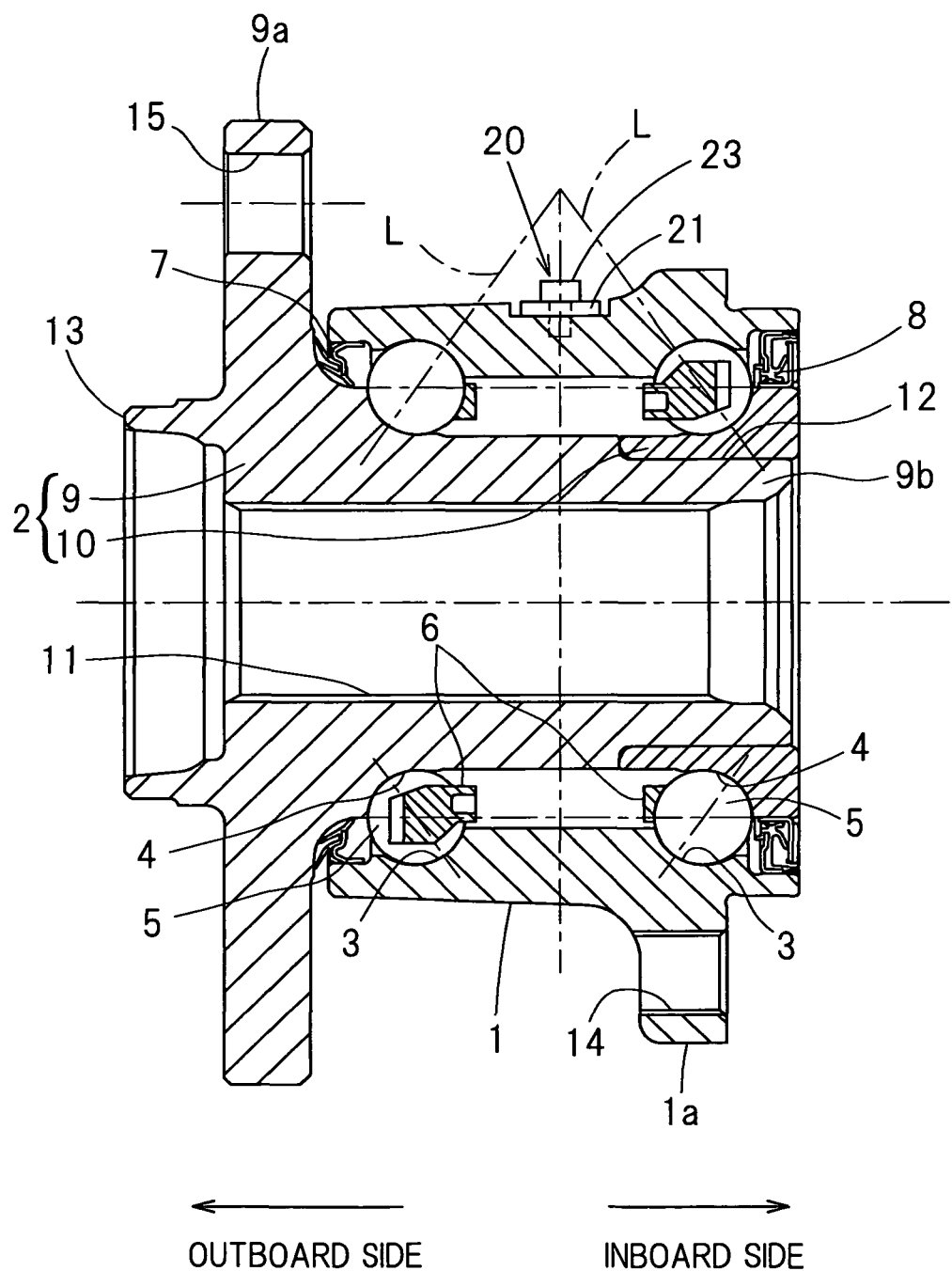
FIG. 5 is a sectional view showing the sensor equipped wheel support bearing assembly according to a second embodiment of the present invention.

FIG. 5 illustrates a second embodiment of the present invention. The sensor equipped wheel support bearing assembly according to this second embodiment is featured in that the strain generating member 21 in each of the sensor units 20 is disposed at a location axially intermediate of the double rows of the rolling elements 5. The other structural features thereof are similar to those shown in and described with reference to FIGS. 1 to 4 in connection with the first embodiment. Positioning of the respective sensor unit 20 with the corresponding strain generating member 21 held at the location axially intermediate of the double rows of the rolling elements 5 in the manner described above results in that the strain generating member 21 is held at such location farthest from both of the rows of the rolling elements 5 and, therefore, the influence brought about by the rolling element load can be eliminated and the estimating accuracy can be correspondingly increased.

FIG. 6 to FIGS. 9A to 9C illustrate a third embodiment of the present invention. The sensor equipped wheel support bearing assembly according to the third embodiment is similar to that shown in and described with particular reference to FIGS. 1 to 4 in connection with the previously described first embodiment, but differs therefrom in that a correcting section 31 for correcting the output signal of the strain sensor 22 in the corresponding sensor unit 20 is employed at a stage preceding the estimating section 30. Also, an outer periphery of the outer member 1 is provided with a rolling element position detecting device 40 for detecting the position of the outboard row of the rolling elements 5. The rolling element position detecting device 40 includes, as shown in FIG. 7B as will be referred to in the subsequent description, a plurality of rolling element sensors 42, and the correcting section 31 is connected with the strain sensor 22 in the sensor unit 20 and the rolling element sensors 42. Other structural features than those described above are similar to those shown in and described with reference to FIGS. 1 to 4 in connection with the previously described first embodiment of the present invention.

Figure 6:
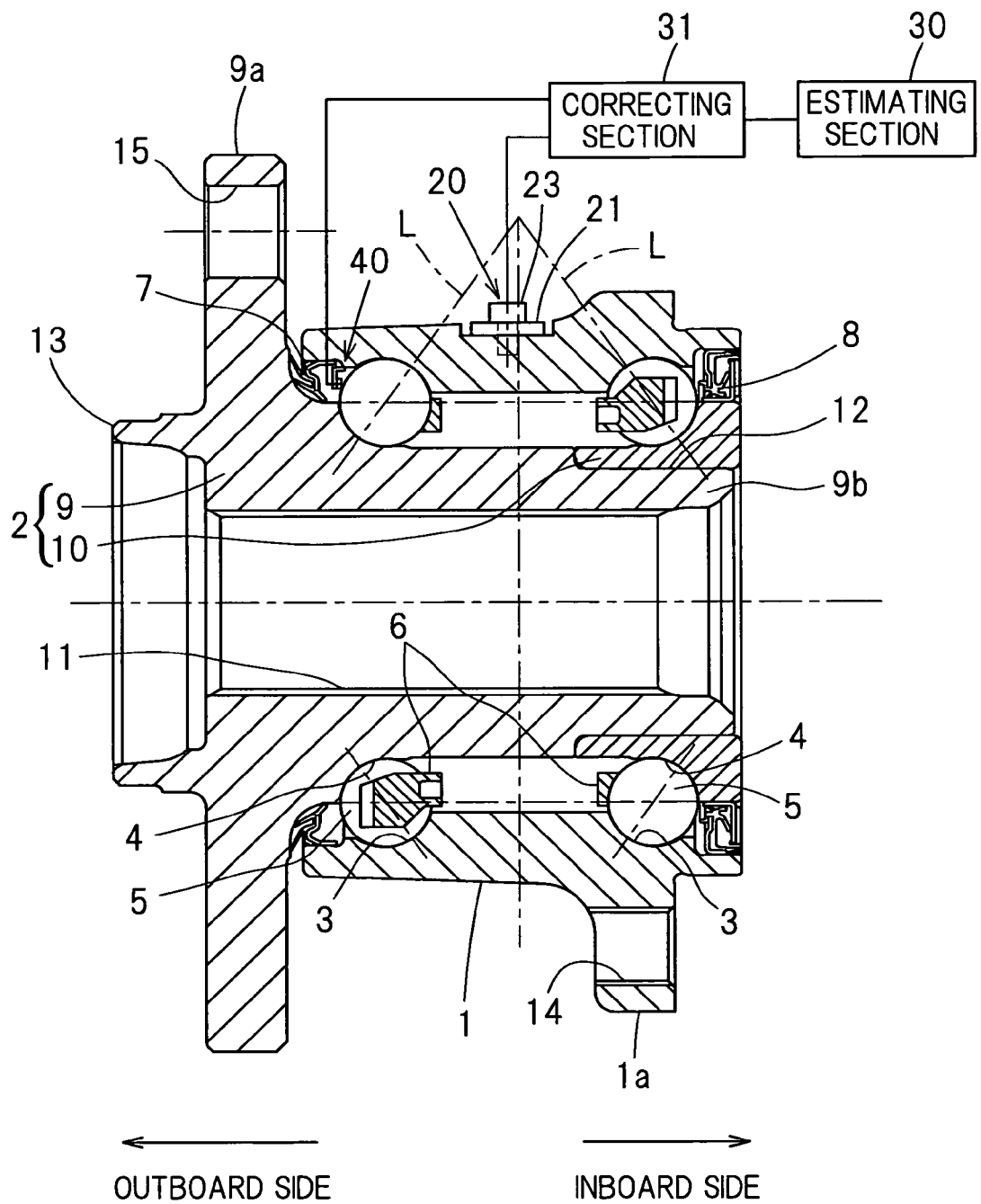
FIG. 6 is a diagram illustrating a sectional view of the sensor equipped wheel support bearing assembly according to a third embodiment of the present invention shown together with a block diagram of the conceptual construction of the detecting system thereof.
Figure 7A:
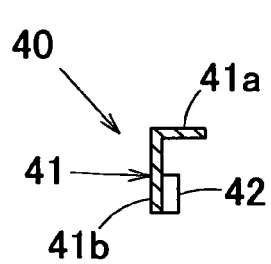
FIG. 7A is a sectional view showing a rolling element position detecting device in the sensor equipped wheel support bearing assembly.
Figure 7B:
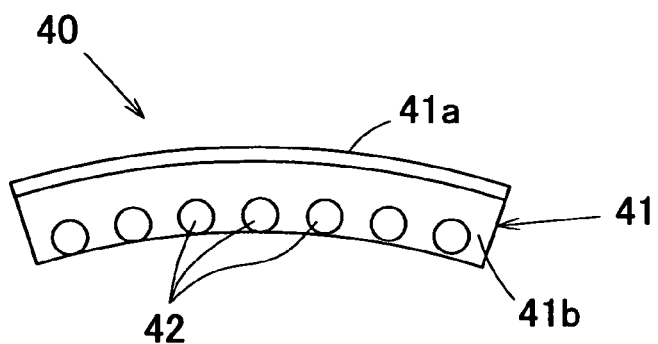
FIG. 7B is a front elevational view thereof.

The rolling element position detecting device 40 referred to above is provided on an inner periphery of the outer member 1 and includes, as shown in FIGS. 7A and 7B in a sectional view and a front elevational view, respectively, an arcuate sensor support member 41 coaxial with the bearing unit, when viewed from front, and the plurality of rolling element sensors 42 fitted to the sensor support member 41. As best shown in FIG. 7A, the sensor support member 41 is of an L-sectioned shape and is made up of an cylindrical wall portion 41a, adapted to be mounted on an inner diametric surface of the outer member 1, and an upright wall portion 41b extending radially inwardly from one end of the cylindrical wall portion 41a, the upright wall portion 41b having a circumference length corresponding to the pitch P of arrangement of the rolling elements 5. This sensor support member 41 is, as best shown in FIG. 6, fitted to the inner diametric surface of the outer member 1 with the upright wall portion 41b held at an axial position on the outboard side of the outboard row of the rolling surface 4 so as to confront the outboard row of the rolling elements 5. The plural rolling element sensors 42 are, as best shown in FIG. 7B, fitted to one side face of the upright wall portion 41b of the sensor support member 41, which is oriented towards the inboard side, and are spaced an equal distance from each other in a direction circumferentially thereof. For each of the rolling element sensors 42, a magnetic sensor such as, for example, a Hall sensor, MR sensor or MI sensor may be employed, and the respective rolling element sensor 42 is operable to detect a change in magnetism as the rolling elements 5 move successively in front of such sensor.

The correcting section 31 corrects an output signal from the strain sensor 22 in each of the sensor units 20, based on the rolling element position detected by the rolling element position detecting device 40, that is, respective output signals from the rolling element sensors 42.

Figure 8:
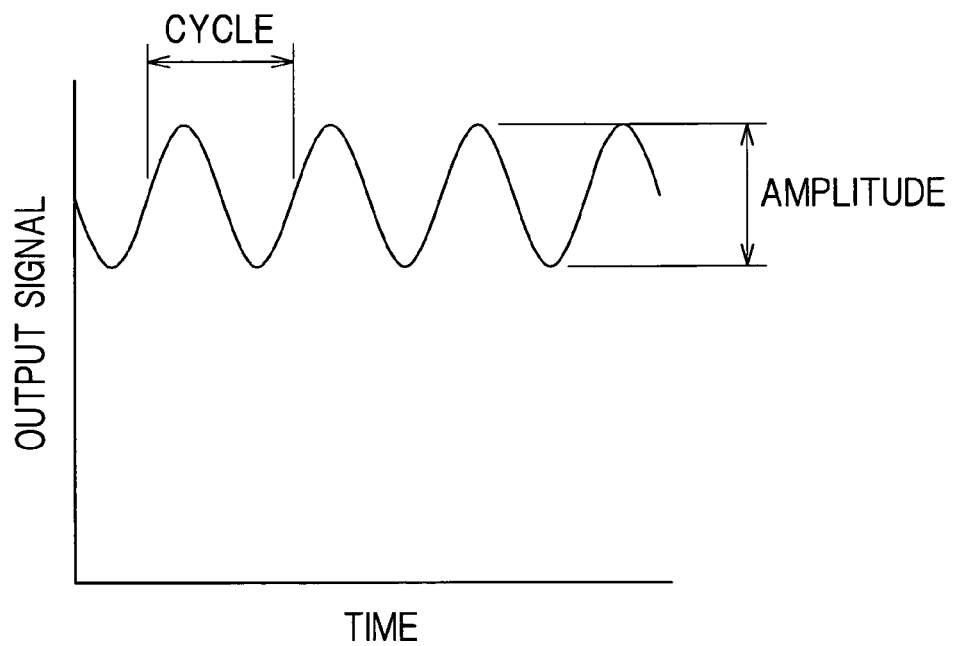
FIG. 8 is a chart showing the waveform of an output signal of the sensor unit in the sensor equipped wheel support bearing assembly.
Figure 9A:
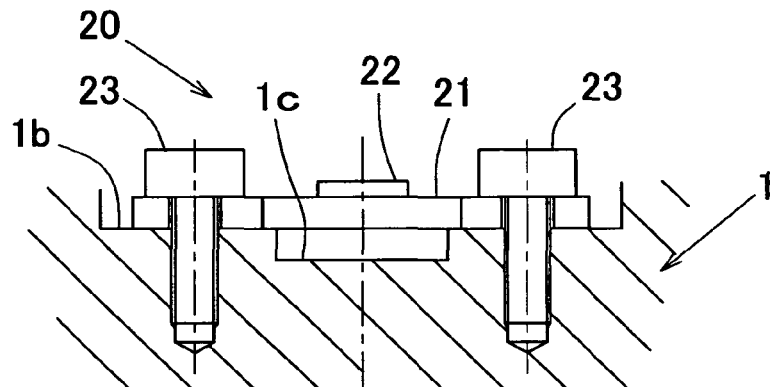
FIG. 9A is an explanatory diagram showing how the position of rolling elements affects an output signal of the sensor unit.
Figure 9B:
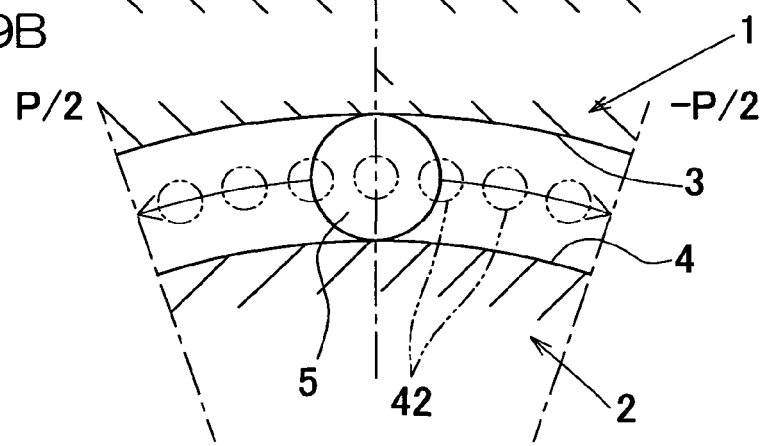
FIG. 9B is an explanatory diagram showing how the position of rolling elements affects an output signal of the sensor unit.

Although as hereinbefore discussed, when the respective positions at which the sensor units 20 are disposed are carefully and properly selected, the influence which may be brought on the respective output signals from the strain sensors 22 in the sensor units 20 by the rolling elements 5 moving past can be reduced, such influence still remains. In other words, during the rotation of the wheel support bearing assembly, the output signal of the strain sensor 22 in each of the sensor units 20 has an amplitude accompanying a periodic change such as shown in the waveform of FIG. 8. Also, during the stopping time of the bearing assembly, the output signal of the strain sensor 22 is affected by the position of the rolling elements 5. Specifically, referring to FIG. 9C, when as shown in FIGS. 9A and 9B each of the rolling element 5 moves past the position nearest to the strain sensor 22 in the sensor unit 20 (or is held at such position), the amplitude of the output signal of the strain sensor 22 attains the maximum value, but as the respective rolling element 5 moves away from such position (or is held at a position away from such position) the amplitude of the output signal of the strain sensor 22 decreases. During the rotation of the wheel support bearing assembly, the rolling elements 5 move successively past the vicinity of the site of installation of the sensor unit 20 at intervals of the predetermined pitch P of arrangement of the rolling elements 5 and, accordingly, the amplitude of the output signal of the strain sensor 22 cyclically changes to depict such a waveform as shown by the solid line in FIG. 9C. In view of the above, the correcting section 31 referred to above corrects the output signal of the strain sensor 22 in dependence on the rolling element position detected by the rolling element position detecting device 40 in the following manner. Specifically, when the rolling element 5 assumes, for example, the position nearest to the strain sensor 22, the amplitude of the output signal of the strain sensor 22 (which is the maximum value at this time), is corrected to reduce by a predetermined maximum value. On the other hand, when the rolling element 5 is brought to a position which is ±P/2 away from the position nearest to the strain sensor 22, the amplitude of the output signal of the strain sensor 22 (which is the minimum value at this time) is corrected to increase by a predetermined maximum value. When the rolling element 5 lies substantially intermediate between those two positions referred to above, the amplitude of the output signal of the strain sensor 22 is corrected to increase or decrease by means of a linear interpolation or the like depending on such position. In this way, the amplitude of the output signal of the strain sensor 22 is corrected as shown by the chain line in FIG. 9C and the influence brought about by the rolling element 5 can be eliminated.

Even though the respective position at which the sensor unit 20 is disposed is carefully and properly selected, the influence brought about by the position of the rolling element 5 remains in the output signal of the strain sensor 22, but in this case, the correcting section 31 corrects the output signal of the strain sensor 22 in dependence on the rolling element position detected by the rolling element position detecting device 40 and, therefore, the influence brought about by the position of the rolling element 5 is removed regardless of whether the bearing assembly is rotating or whether it is halted. Thus, the estimating section 30 can accurately estimate the load (the vertically oriented load Fz, the load Fx that acts as the driving force or the braking force and the axially oriented load Fy) acting on the wheel support bearing assembly or between the vehicle wheel tire and the road surface.

A fourth embodiment will now be described in detail with particular reference to FIG. 10 to FIGS. 11A to 11C. The sensor equipped wheel support bearing assembly according to the fourth embodiment is similar to that shown in and described with reference to FIG. 6 to FIGS. 9A to 9C in connection with the third embodiment, but differs therefrom in that an averaging section 33 for averaging the output signal of the strain sensor 22 is disposed as the correcting section at a stage preceding the estimating section 30. Also, a rotation detector 43 for detecting the rotation of the inner member 2 is provided at an axially intermediate position within the bearing assembly. The rotation detector 43 is of a radial type and is made up of a pulsar ring 44 and a magnetic element sensor 45. The averaging section 33 is connected with the strain sensor 22 in the sensor unit 20 and the magnetic element sensor 45 of the rotation detector 43. Other structural features than those described above are similar to those shown in and described with reference to FIGS. 1 to 4 in connection with the first embodiment.

The rotation detector 43 is made up of the pulsar ring 44, which is a sensor target mounted on the outer periphery of the inner member 2, and the magnetic element sensor 45 provided on the inner periphery of the outer member 1 so as to confront the pulsar ring 44 in a radial direction thereof. The pulsar ring 44 may be a multipolar magnet having magnetic poles N and S arranged in a direction circumferentially thereof, or any other elements having cyclic magnetism change in a direction circumferentially thereof, such as a magnetic element ring having gear-like serrations arranged in a direction circumferentially thereof. The magnetic element sensor 45 referred to above is operable to detect the magnetic change of the pulsar ring 44 then rotating together with the inner member 2 and may be employed in the form of, for example, a Hall sensor, MR sensor or MI sensor.

Figure 11A:
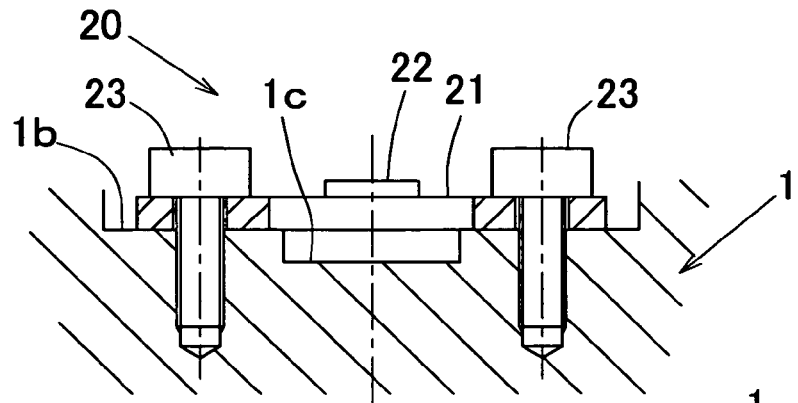
FIG. 11A is an explanatory diagram showing how the position of the rolling elements affects the output signal of the sensor unit.
Figure 11B:
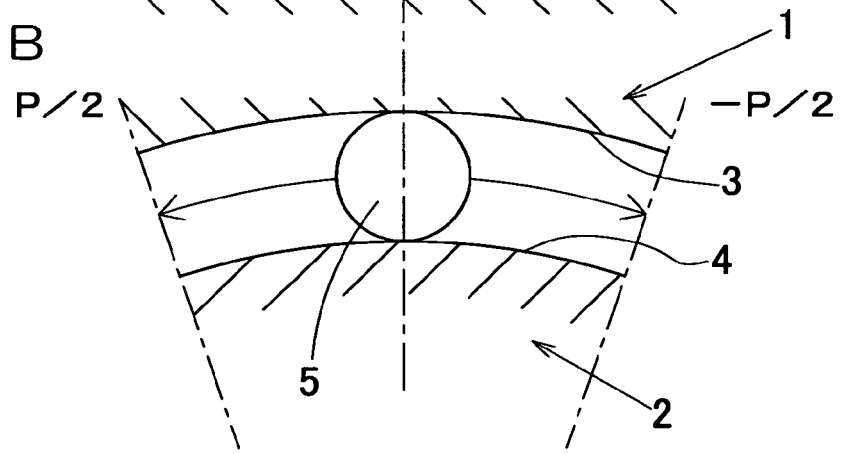
FIG. 11B is an explanatory diagram showing how the position of the rolling elements affects the output signal of the sensor unit.
Figure 11C:
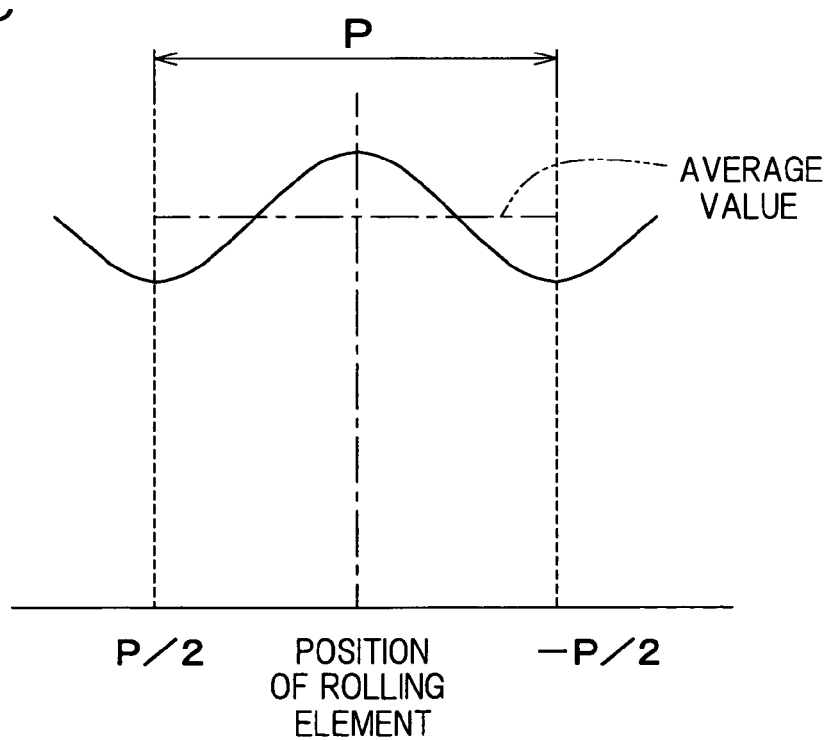
FIG. 11C is an explanatory diagram showing how the position of the rolling elements affects the output signal of the sensor unit.

The averaging section 33 is operable to average the amplitude of the output signal of the strain sensor, appearing during the movement of the rolling element 5 over a distance equal to the pitch P of arrangement of the rolling elements 5, in a manner as shown by the chain line in FIG. 11C, to thereby remove the influence brought about by the rolling element 5. The averaging process performed by the averaging section 33 is carried out in the following manner by way of example. At the outset, the rotational speed of the inner member 2 is calculated from an output signal of the magnetic element sensor 45 of the rotation detector 43 and, then, from the calculated rotational speed, a required length of time T required for the rolling element 5 to angularly move a distance equal to the pitch P of arrangement of the rolling elements 5 is calculated. Thereafter, the arithmetic average of the amplitude value of the output signal of the strain sensor 22, which is sampled at a predetermined cycle t within the required length of time T, is determined. It is to be noted that the sampling cycle t in this case should be a sufficiently short value as compared with the required length of time T referred to above.

As hereinbefore discussed, the influence brought about by the passage of the rolling elements 5 remains in the output signal of the strain sensor 22 unless care is taken, but in this case the averaging section 33 averages the output signal of the strain sensor 22 and, therefore, the influence brought about by the passage of the rolling elements 5 can be removed. In view of the above, the estimating section 30 can accurately estimate the load (the vertically oriented load Fz, the load Fx that acts as the driving force or the braking force and the axially oriented load Fy) acting on the wheel support bearing assembly or between the vehicle wheel tire and the road surface.

Figure 12:
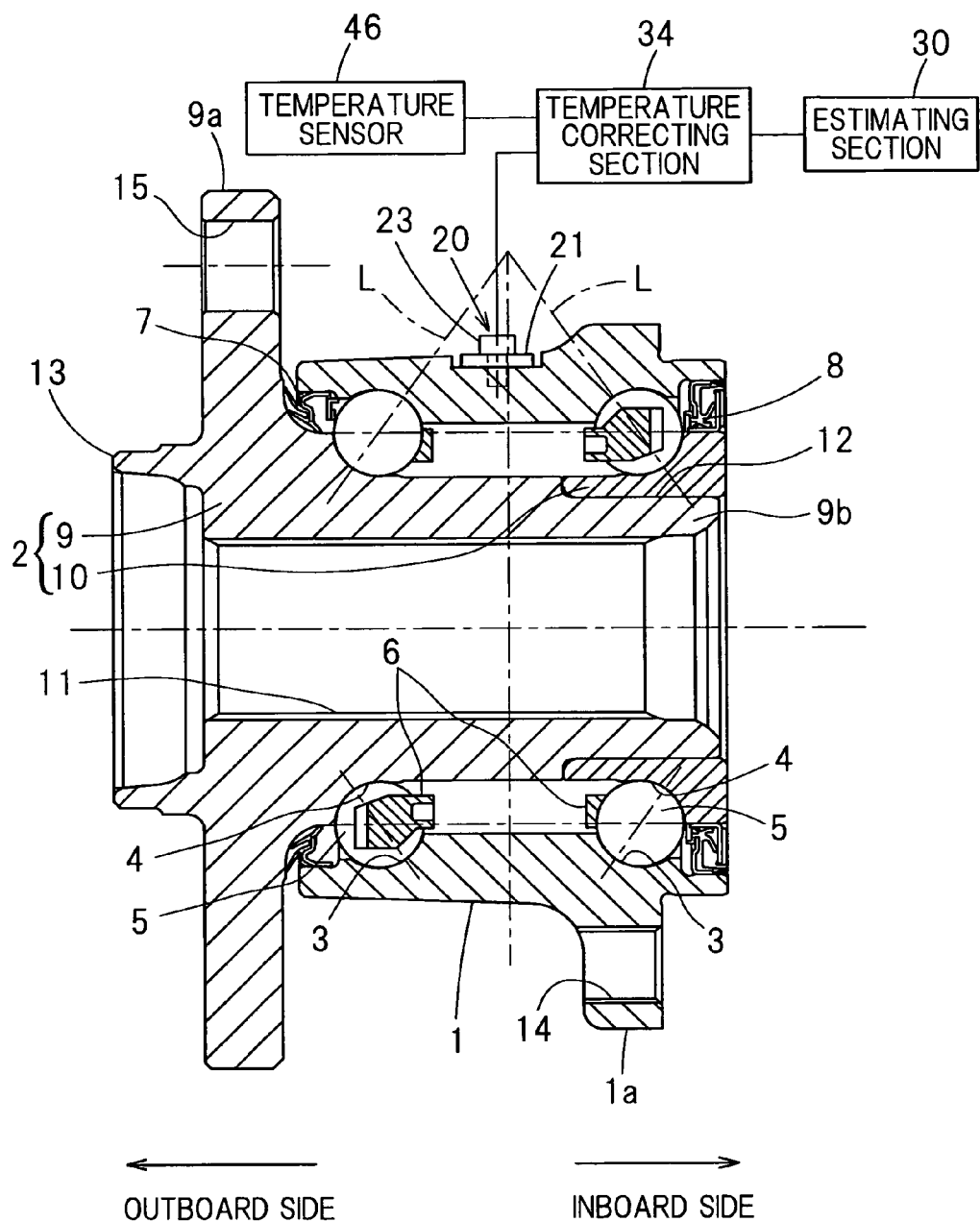
FIG. 12 is a diagram illustrating a sectional view of the sensor equipped wheel support bearing assembly according to a fifth embodiment of the present invention shown together with a block diagram of the conceptual construction of the detecting system thereof.

FIG. 12 illustrates a fifth embodiment of the present invention. The sensor equipped wheel support bearing assembly according to this fifth embodiment is similar to that shown in and described with particular reference to FIG. 6 to FIGS. 9A to 9C in connection with the third embodiment, but differs therefrom in that a temperature correcting section 34 for correcting the output signal of the strain sensor 22 in the sensor unit 20 in dependence on the temperature of the wheel support bearing assembly or the ambient temperature is disposed as the correcting section at a stage preceding the estimating section 30. Also, a temperature sensor 46 is provided at a portion of the outer diametric surface of the outer member 1 in the vicinity of the site of installation of each of the respective sensor units 20 or on an outer surface side of the strain generating member 21 in the respective sensor unit 20. For this temperature sensor 46, either a thermister or a platinum resistance element, for example, may be employed. The strain sensor 22 in the sensor unit 20 and the temperature sensor 46 are connected with the temperature correcting section 34. Other structural features than those described above are similar to those shown in and described with reference to FIGS. 1 to 4 in connection with the first embodiment.

The temperature correcting section 34 corrects the output signal of the strain sensor 22 in the associated sensor unit 20, based on the output signal of the temperature sensor 46. Accordingly, the estimating section 30 is inputted with the output signal of the strain sensor 22, which has been corrected by the temperature correcting section 34.

Since in this fifth embodiment described hereinabove the temperature correcting section 34 is employed to correct the output signal of the strain sensor 22 in dependence on the output signal of the temperature sensor 46, provided on the outer diametric surface of the outer member 1 or in the strain generating member 21 in the sensor unit 20 as hereinabove described, the output signal of the strain sensor 22 is corrected in dependence on a measured value of the wheel support bearing assembly temperature or the ambient temperature and, therefore, the load can be accurately estimated.

Figure 13:
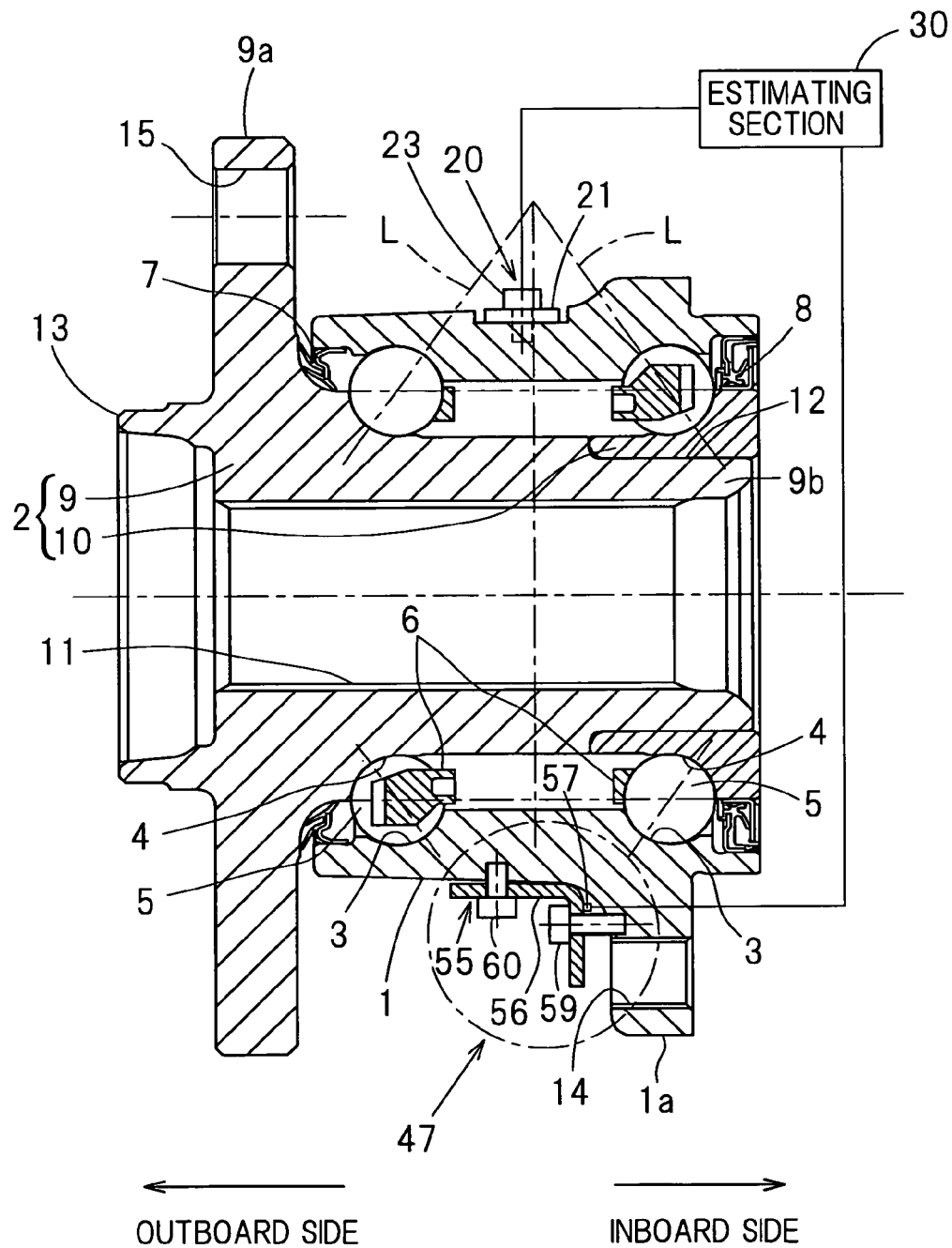
FIG. 13 is a diagram illustrating a sectional view of the sensor equipped wheel support bearing assembly according to a sixth embodiment of the present invention shown together with a block diagram of the conceptual construction of the detecting system thereof.
Figure 14:
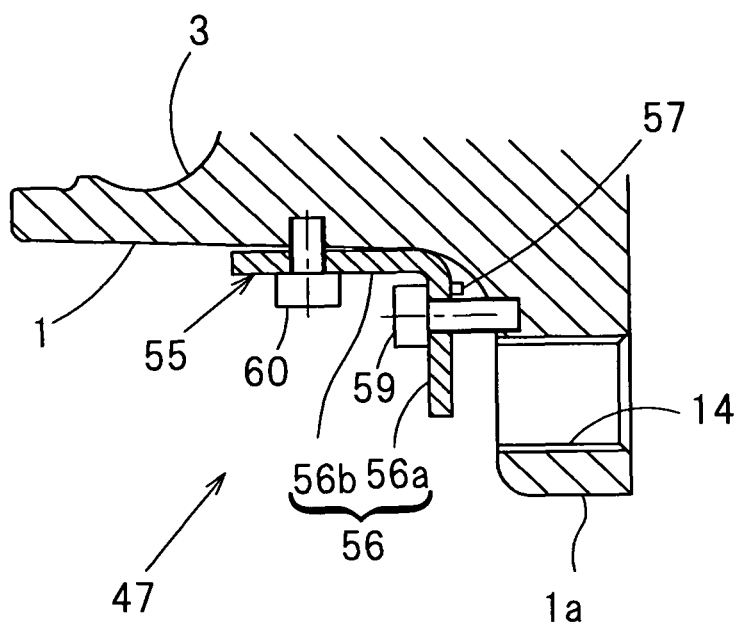
FIG. 14 is a fragmentary enlarged sectional view of FIG. 13.

FIGS. 13 and 14 illustrate a sixth embodiment of the present invention. The sensor equipped wheel support bearing assembly according to this sixth embodiment is similar to that shown in and described with reference to FIGS. 1 to 4 in connection with the first embodiment, but differs therefrom that a direction determining sensor 47 for determining the direction of the axially oriented load Fy estimated by the estimating section 30, is employed. This direction determining sensor 47 is of a structure, in which a sensor unit 55 including a strain generating member 56 and a sensor 57 fitted to the strain generating member 56 for detecting a strain induced in the strain generating member 56 is fixed to the outer member 1.

The strain generating member 56 of the direction determining sensor 47 is, as best shown in FIG. 14 on an enlarged scale, formed by bending a plate member, made of a metallic material such as, for example, a steel material, so as to represent an L-shaped configuration including a radially oriented piece 56a, confronting an outboard oriented side face of the flange 1a of the outer member 1 and in the vicinity of the screw holes 14 in the flange 1a, and an axially oriented piece 56b confronting the outer diametric surface of the outer member 1. The sensor 57 is fixed to one side face of the radially oriented piece 56a. This strain generating member 56 is fastened to an outer peripheral portion of the outer diameter 1 by means of bolts 59 and 60.

The site of installation of the direction determining sensor 47 is where although the amount of deformation is large with respect to the axially oriented load Fy, the amount of deformation is small with respect to radially oriented load such as the vertically oriented load Fz and the load Fx resulting from the driving force or the braking force. By positioning the direction determining sensor 47 at such site, a force acting on the direction determining sensor 47 switches over between a compressive force and a pulling force and, therefore, when, for example, a magnitude determination of the output signal is carried out with respect to a predetermined threshold value, the direction of the axially oriented load Fy can be determined. An output signal of the direction determining sensor 47 is fed to the estimating section 30 and the estimating section 30 determines the direction of the axially oriented load Fy from the output signal so fed thereto.

A seventh embodiment of the present invention will now be described in detail with particular reference to FIGS. 15 to 18. In describing this seventh embodiment, component parts similar to those shown in and described with reference to FIGS. 1 to 4 in connection with the first embodiment are designated by like reference numerals and the details thereof are not therefore reiterated. In any event, however, this seventh embodiment is similar to that shown in and described with reference to FIGS. 1 to 4 in connection with the first embodiment, but differs therefrom in that the strain generating member 21 in the sensor unit 20 is disposed at a position on the inboard side of one of the plurality of rows of the rolling elements 5, which is on the inboard side of the outer member 1, that is, the inboard row of the rolling elements 5. In this seventh embodiment, three of more of the sensor units 20 are provided.

Figure 15:
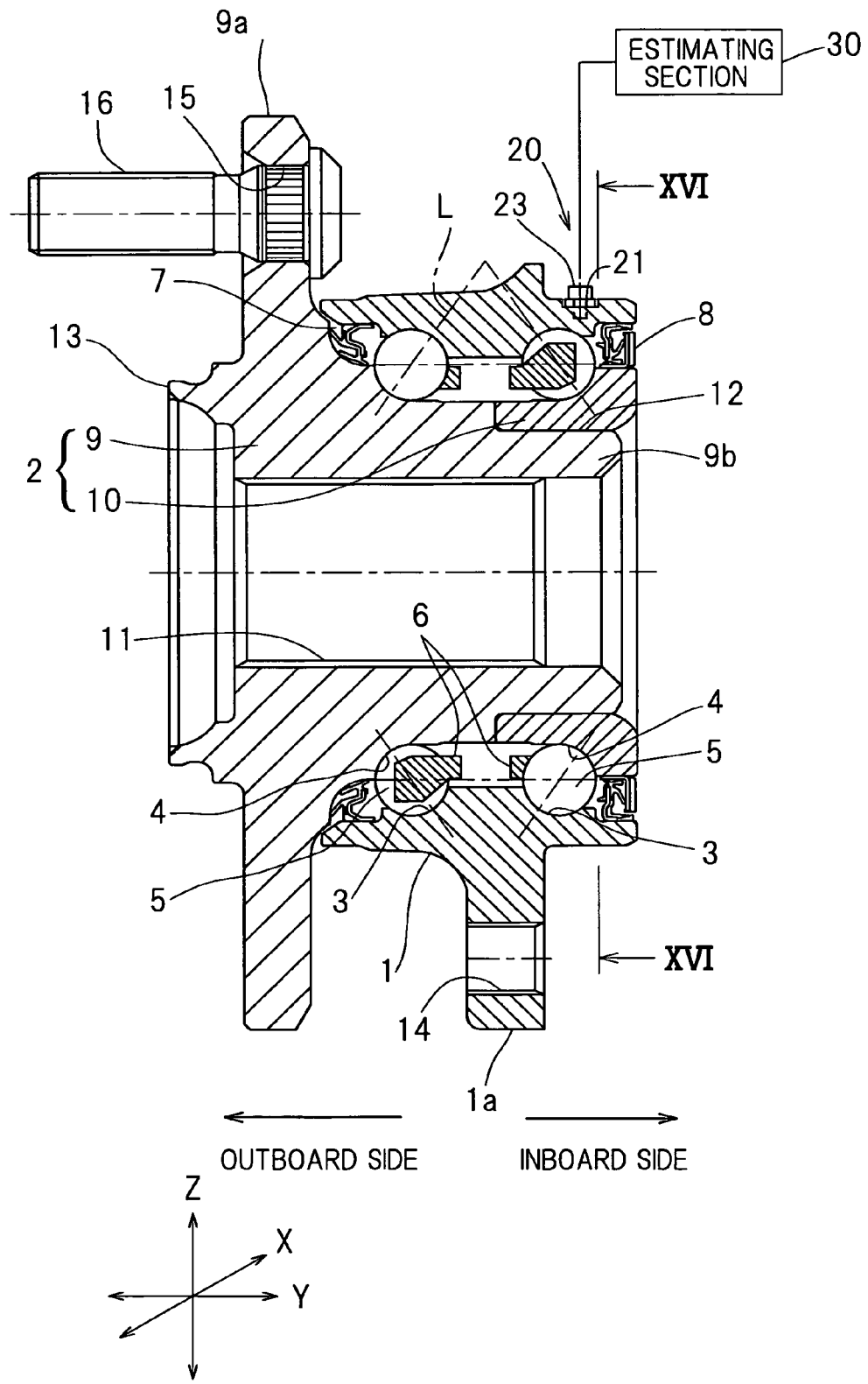
FIG. 15 is a diagram illustrating a sectional view of the sensor equipped wheel support bearing assembly according to a seventh embodiment of the present invention shown together with a block diagram of the conceptual construction of the detecting system thereof.
Figure 16:
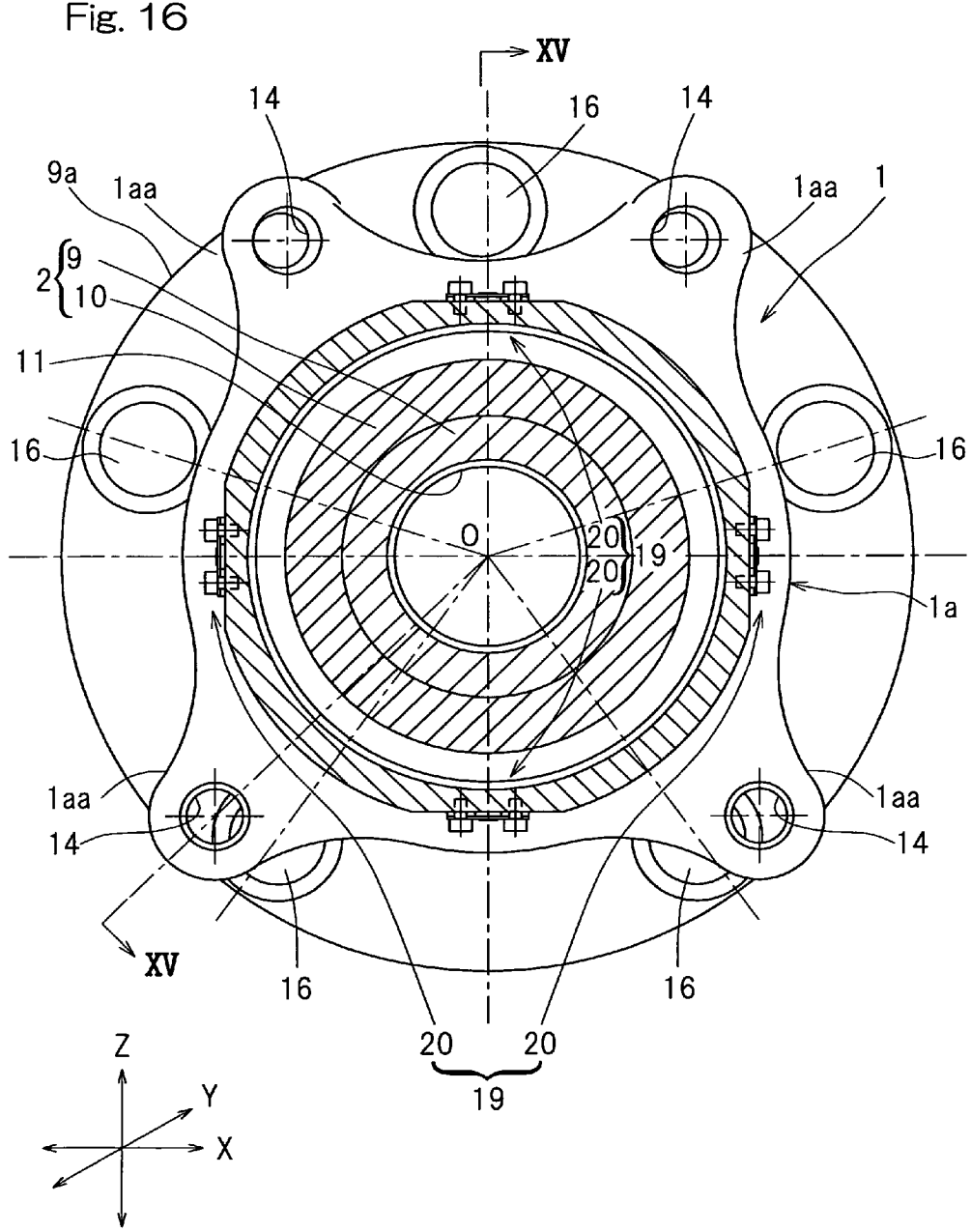
FIG. 16 is a front elevational view showing an outer member of the sensor equipped wheel support bearing assembly.

FIG. 16 illustrates a front elevational view of the outer member 1 of the wheel support bearing assembly as viewed from the outboard side. It is, however, to be noted that FIG. 15 illustrates a cross section taken along the line XV-XV in FIG. 16. FIGS. 15 and 16 correspond respectively to FIGS. 1 and 2 shown in connection with the previously described first embodiment and like component parts are designated by like reference numerals. It is also to be noted that in FIGS. 15 and 16, the hub bolts 16, which have not been shown in FIGS. 1 and 2 in describing the first embodiment, are shown.

Figure 17:
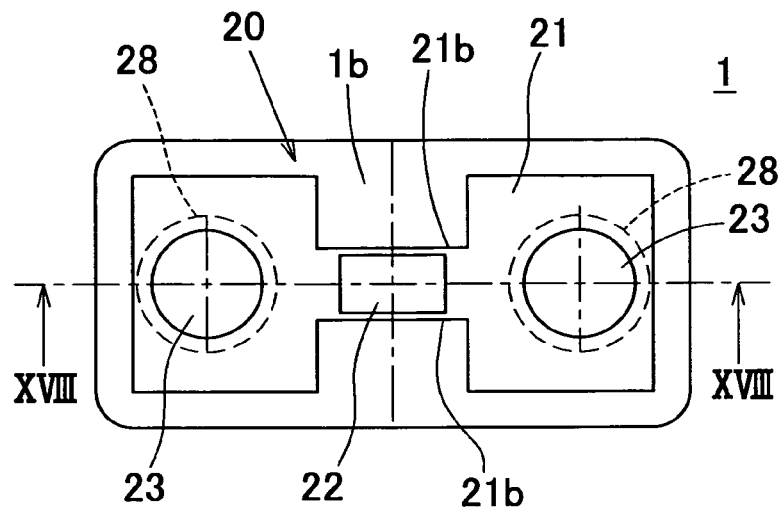
FIG. 17 is an enlarged top plan view showing the sensor unit employed in the sensor equipped wheel support bearing assembly.
Figure 18:
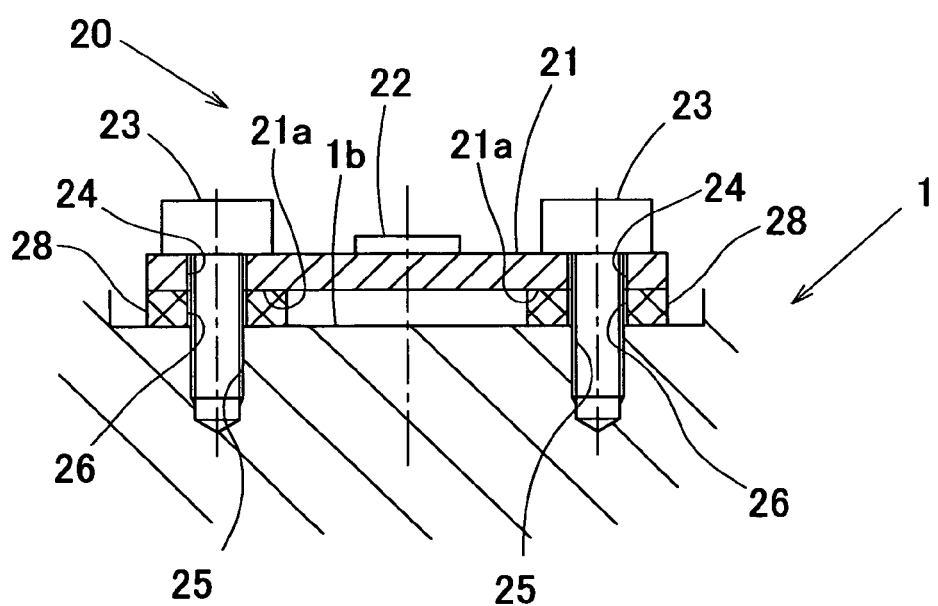
FIG. 18 is a cross sectional view taken along the line XVIII-XVIII in FIG. 17.
Figure 19:
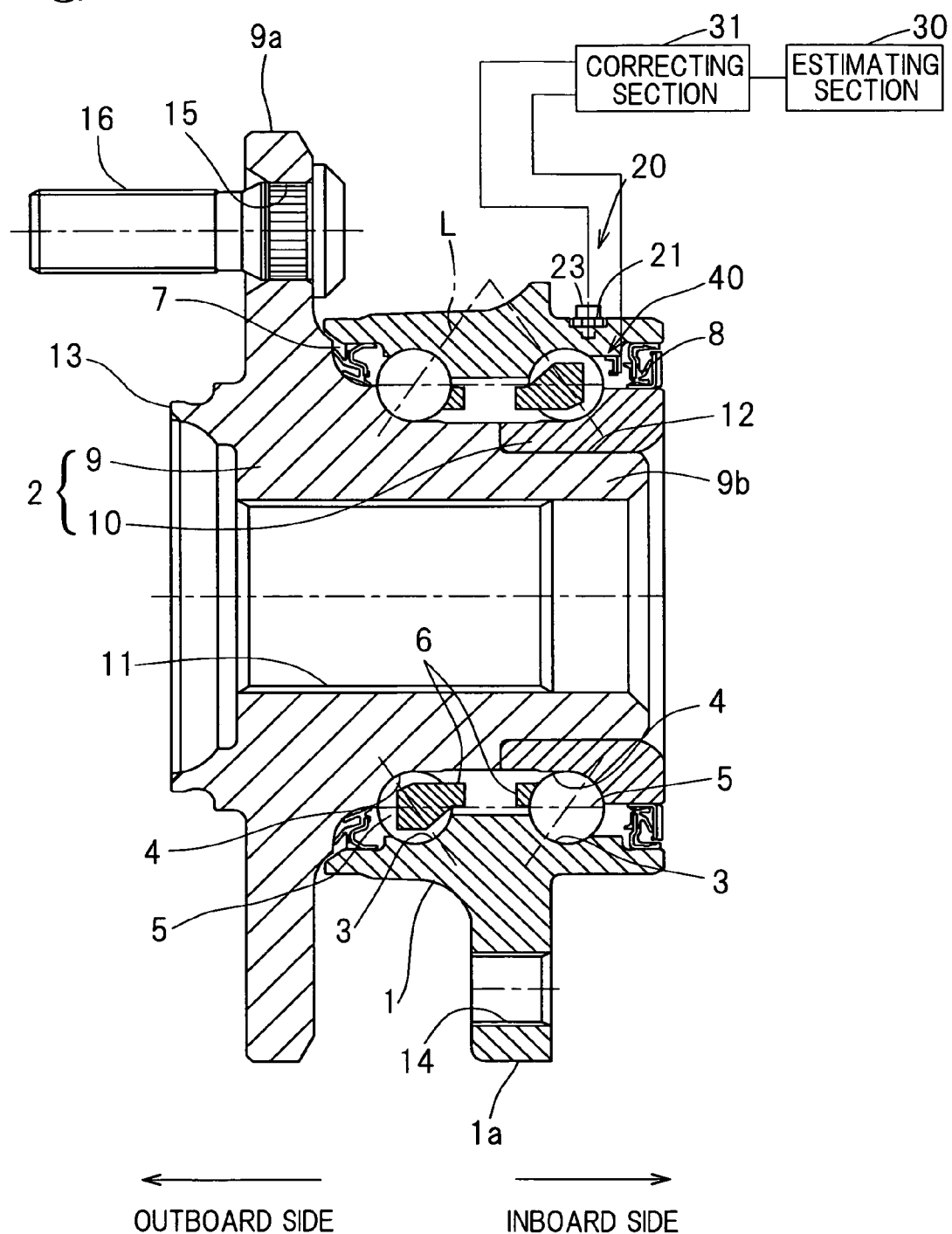
FIG. 19 is a diagram illustrating a sectional view of the sensor equipped wheel support bearing assembly according to a third embodiment of the present invention shown together with a block diagram of the conceptual construction of the detecting system thereof.

While those sensor units 20 are so formed as shown in FIGS. 17 and 18 in enlarged top plan and enlarged sectional views, respectively, FIGS. 17 and 18 correspond respectively to FIGS. 3A and 4 both referred to in the description of the first embodiment and, therefore, component parts similar to those shown in FIGS. 3A and 4 are designated by like reference numerals employed therein and the details thereof are not therefore reiterated.

In the practice of the seventh embodiment, as best shown in FIG. 15, the strain generating member 21 in the sensor unit 20 is disposed at a position departing from the lines L, shown by the single dotted chain lines, which pass through the centers of the rolling elements 5 and extends in a direction defined by the rolling element contact angles, and at a position on the inboard side of one of the plurality of rows of the rolling elements 5, which is on the inboard side of the outer member 1, that is, the inboard row of the rolling elements 5. More specifically, the sensor unit 20 is arranged at a portion of the outer diametric surface of the outer member 1, which is on the inboard side of the vehicle body fitting flange 1a.

Also, as best shown in FIG. 17, the sensor unit 20 is of a structure, in which the two contact fixing segments 21a of the strain generating member 21 in such sensor unit 20 are arranged at the same position of the outer member 1 in the axial direction and at respective positions spaced a distance from each other in the circumferential direction. Those contact fixing segments 21a are fixed to the outer diametric surface of the outer member 1 through respective spacers 28 by means of the bolts 23. Accordingly, the strain sensor 22 in the sensor unit 20 detects the strain appearing in the vicinity of the cutout portions 21b in the strain generating member 21, acting in a direction circumferentially of the outer member 1. Each of the bolts 23 is, after having been passed through the corresponding bolt insertion hole 24, defined in the associated contact fixing segment 21a so as to extend radially thereof, and then through a bolt insertion hole 26 defined in the associated spacer 28, threaded into the screw hole 25 defined in the outer peripheral portion of the outer member 1. With the contact fixing segments 21a fixed to the outer diametric surface of the outer member 1 through the respective spacers 28 in the manner described above, the intermediate portion of the strain generating member 21 in the form of the thin plate having the cutout portions 21b is separated a distance from the outer diametric surface of the outer member 1 to thereby facilitate deformation of that portion of the strain generating member in the vicinity of the cutout portions 21b.

Since in the sensor equipped wheel support bearing assembly according to the seventh embodiment described above, the strain generating member 21 in the sensor unit 20 is arranged at the position departing from the lines L, passing through the centers of the rolling elements 5 and extending in the direction defined by the rolling element contact angles, and at the position on the inboard side of the inboard row of the rolling elements 5, the strain generating member 21 in the sensor unit 20 is hardly affected by the influence brought about by the rolling element load. Accordingly, the sensor unit 20 can accurately detect the deformation of the outer member 1 caused by the original load, and the load acting between the vehicle wheel tire and the road surface can be accurately detected by the estimating section 30 from the output signal of the sensor unit 20. Also, when the sensor unit is employed in three or more in number, the load estimating accuracy can be increased.

FIG. 19 to FIGS. 20A to 20C illustrate an eighth embodiment of the present invention. This sensor equipped wheel support bearing assembly according to the eighth embodiment is similar to that shown in and described with reference to FIGS. 15 to 18 in connection with the seventh embodiment, but differs therefrom in that a correcting section 31 for correcting an output signal of the strain sensor 22 in the sensor unit 20 is employed at a stage preceding the estimating section 30. Also, a rolling element position detecting device 40 for detecting the position of the inboard row of the rolling elements 5 is provided in the inner periphery of the outer member 1. The rolling element position detecting device 40 includes a plurality of rolling element sensors 42, and the correcting section 31 referred to above is connected with the strain sensor 22 in the sensor unit 20 and the rolling element sensors 42. Other structural features than those described above are similar to those shown in and described with particular reference to FIGS. 15 to 18 in connection with the seventh embodiment.

Figure 9C:
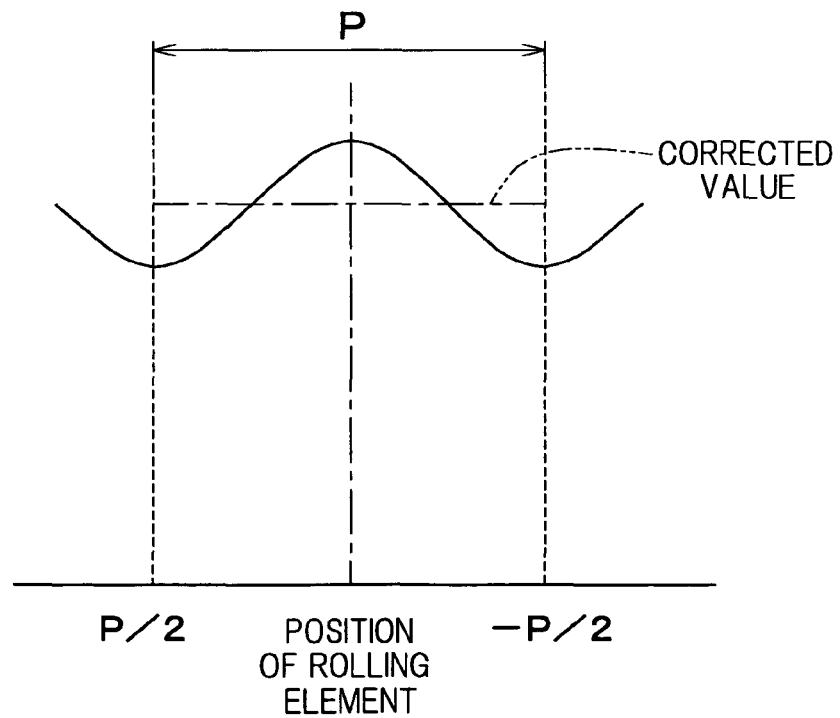
FIG. 9C is an explanatory diagram showing how the position of rolling elements affects an output signal of the sensor unit.
Figure 10:
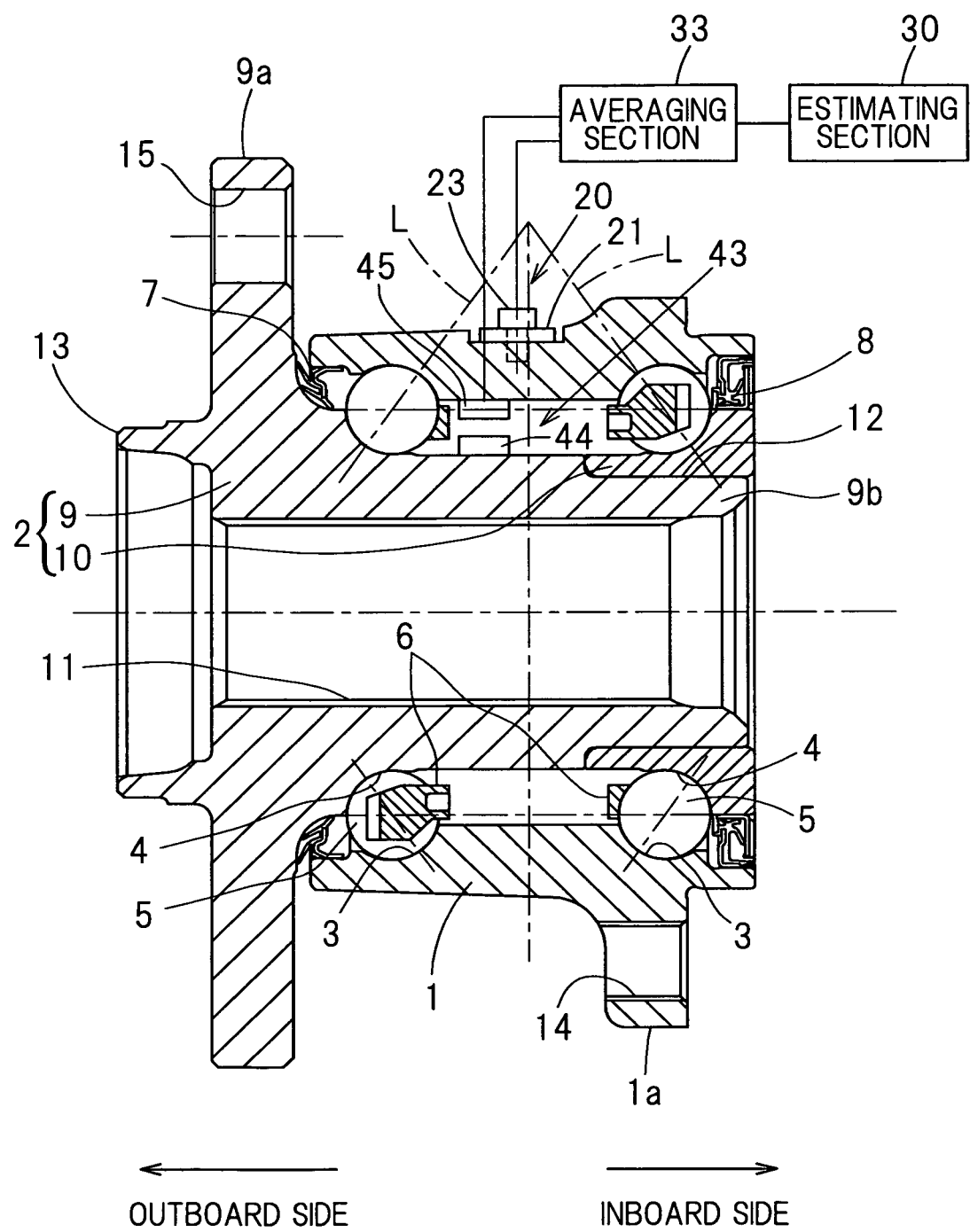
FIG. 10 is a diagram illustrating a sectional view of the sensor equipped wheel support bearing assembly according to a fourth embodiment of the present invention shown together with a block diagram of the conceptual construction of the detecting system thereof.
Figure 20A:
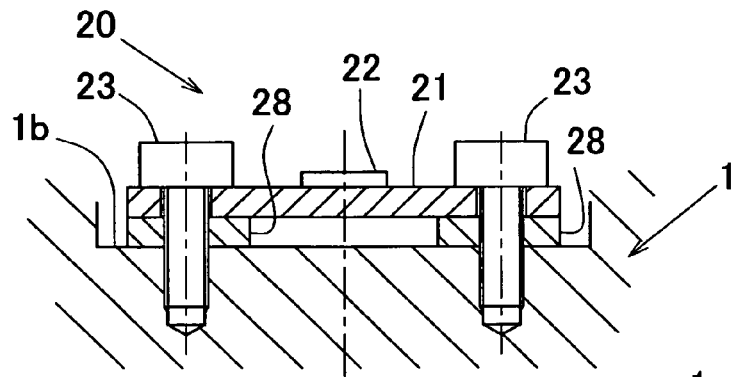
FIG. 20A is an explanatory diagram showing how the position of the rolling elements affects the output signal of the sensor unit.
Figure 20B:
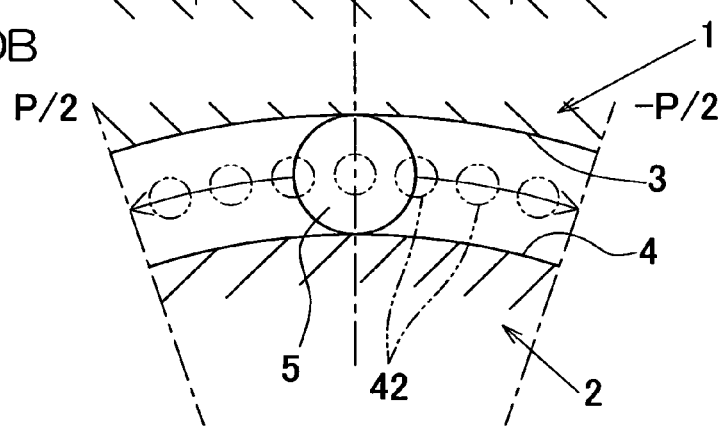
FIG. 20B is an explanatory diagram showing how the position of the rolling elements affects the output signal of the sensor unit.
Figure 20C:
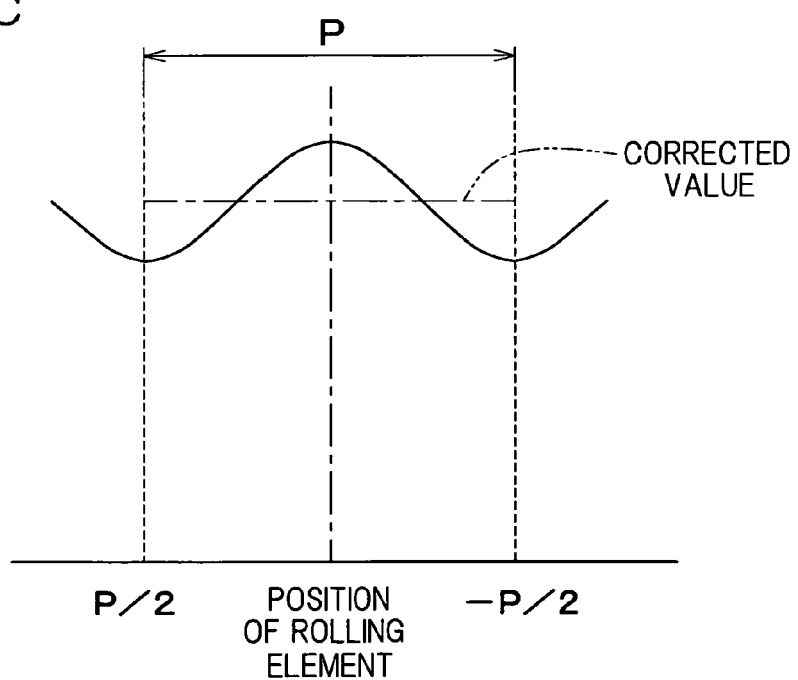
FIG. 20C is an explanatory diagram showing how the position of the rolling elements affects the output signal of the sensor unit.
Figure 21:
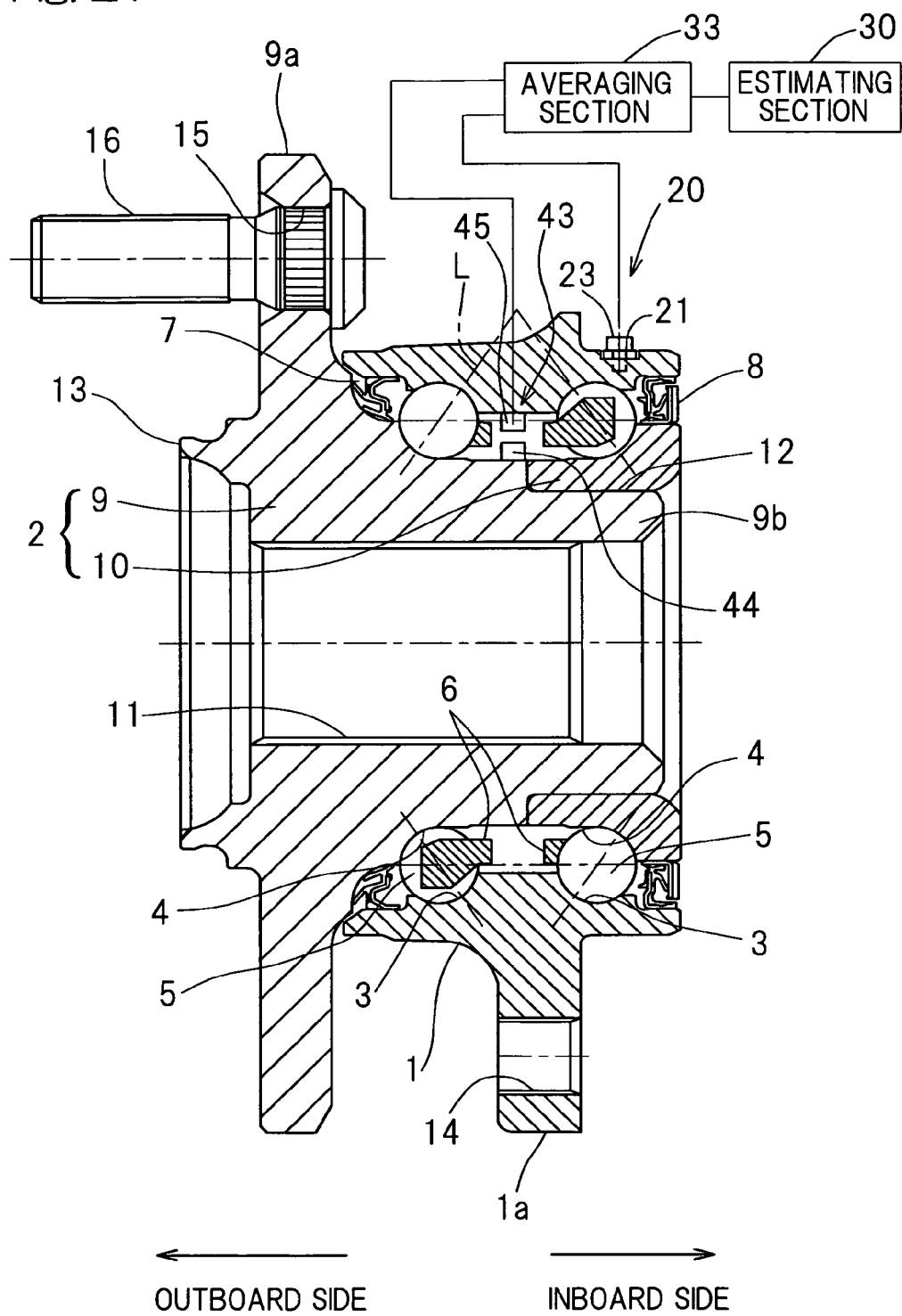
FIG. 21 is a diagram illustrating a sectional view of the sensor equipped wheel support bearing assembly according to a ninth embodiment of the present invention shown together with a block diagram of the conceptual construction of the detecting system thereof.
Figure 22A:
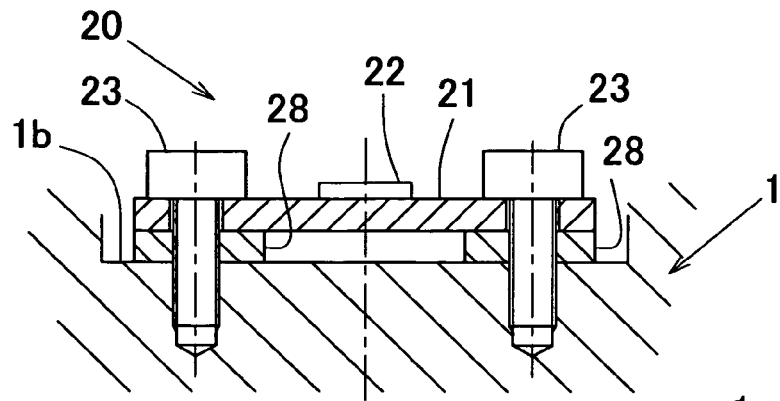
FIG. 22A is an explanatory diagram showing how the revolution of the rolling elements affects the output signal of the sensor unit.
Figure 22B:
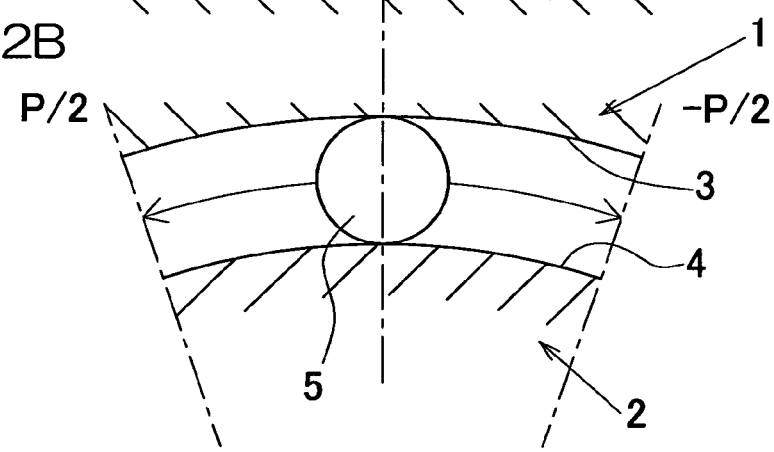
FIG. 22B is an explanatory diagram showing how the revolution of the rolling elements affects the output signal of the sensor unit.
Figure 22C:
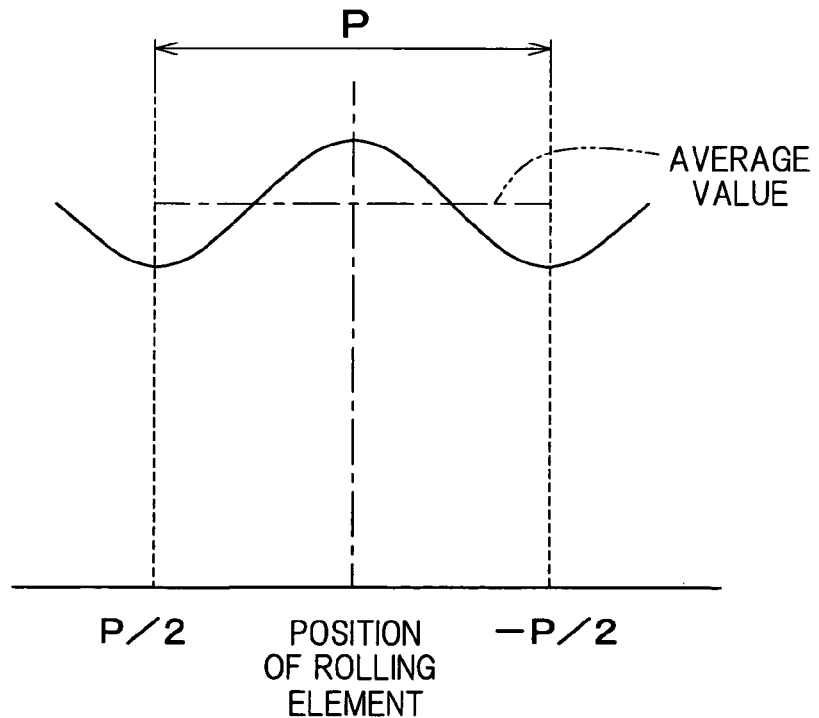
FIG. 22C is an explanatory diagram showing how the revolution of the rolling elements affects the output signal of the sensor unit.

FIGS. 20A to 20C correspond respectively to FIGS. 9A to 9C, which have been previously referred to in describing the third embodiment and, therefore, the details thereof are not reiterated as the description made with reference to FIGS. 9A to 9C equally applies here.

A ninth embodiment of the present invention is shown in FIG. 21 and FIGS. 22A to 22C, reference to which will now be made. The sensor equipped wheel support bearing assembly according to this ninth embodiment is similar to that shown in and described with particular reference to FIG. 19 and FIGS. 20A to 20C in connection with the eighth embodiment, but differs therefrom in that an averaging section 33 for averaging the output signal of the strain sensor 22 is disposed as the correcting section at a stage preceding the estimating section 30. This averaging section 33 is similar to that employed in the practice of the previously described fourth embodiment and, therefore, the details are not reiterated as the description of the averaging means 3 made in connection with the previously described fourth embodiment equally applies here. Other structural features than those described above are similar to those shown in and described with particular reference to FIGS. 15 to 18 in connection with the seventh embodiment. In particular, FIGS. 22A to 22C correspond respectively to FIGS. 9A to 9C and, therefore, the description made previously with reference to FIGS. 9A to 9C equally applies to FIGS. 22A to 22C.

Figure 23:
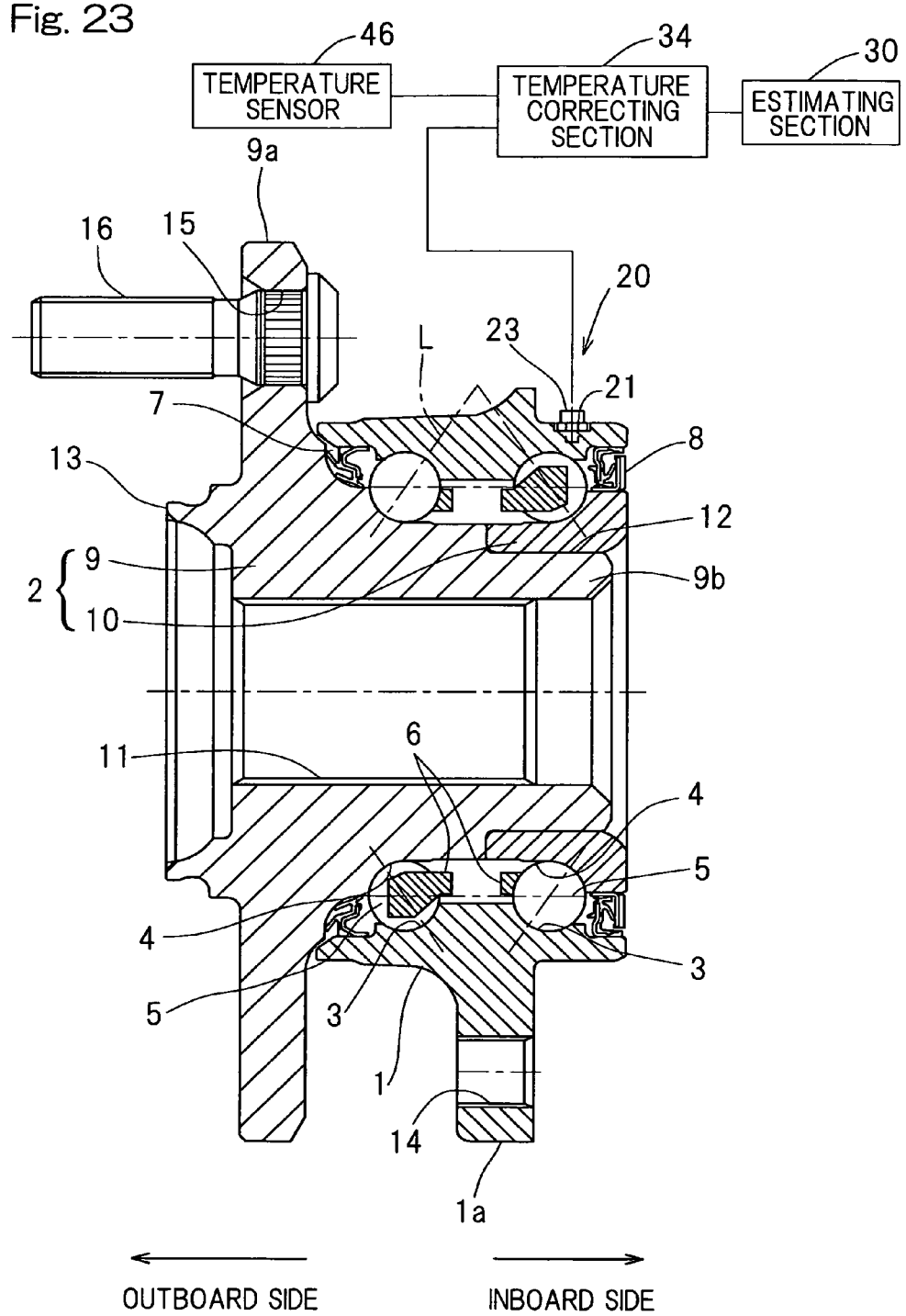
FIG. 23 is a diagram illustrating a sectional view of the sensor equipped wheel support bearing assembly according to a tenth embodiment of the present invention shown together with a block diagram of the conceptual construction of the detecting system thereof.

FIG. 23 illustrates a tenth embodiment of the present invention. The sensor equipped wheel support bearing assembly according to the tenth embodiment is similar to that shown in and described with particular reference to FIG. 19 and FIGS. 20A to 20C in connection with the eighth embodiment, but differs therefrom in that a temperature correcting section 34 for correcting the output signal of the strain sensor 22 in the sensor unit 20 in dependence on the temperature of the wheel support bearing assembly or the ambient temperature is provided as the correcting section at a stage preceding the estimating section 30. In any event, this temperature correcting section 34 is similar to that that has been described in connection with the fifth embodiment and the details thereof are not therefore reiterated as the description of the temperature correcting section 34 made in connection with the fifth embodiment equally applies here. Other structural features than those described above are similar to those shown in and described with particular reference to FIGS. 15 to 18 in connection with the seventh embodiment.

Figure 24:
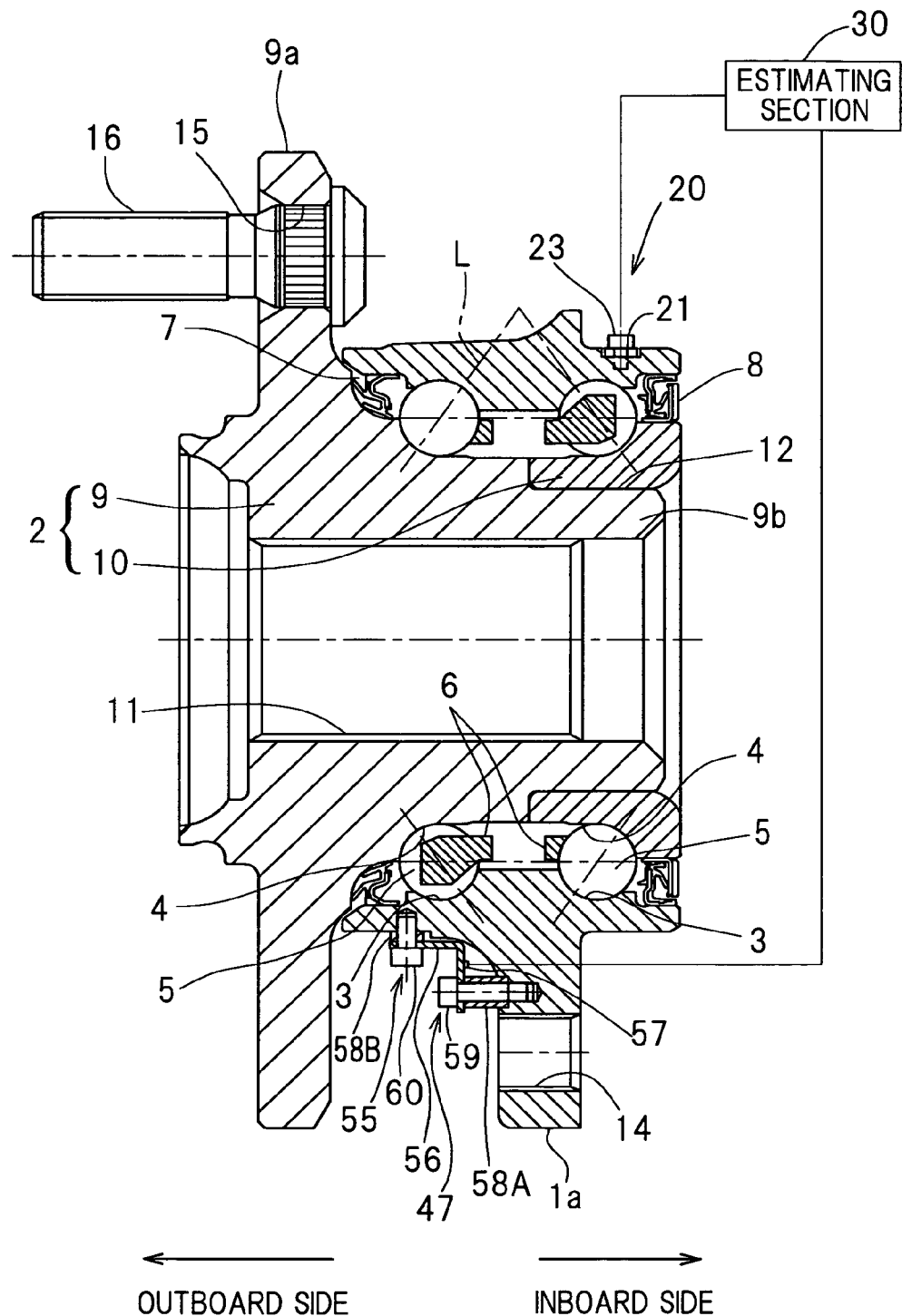
FIG. 24 is a diagram illustrating a sectional view of the sensor equipped wheel support bearing assembly according to an eleventh embodiment of the present invention shown together with a block diagram of the conceptual construction of the detecting system thereof.
Figure 25:
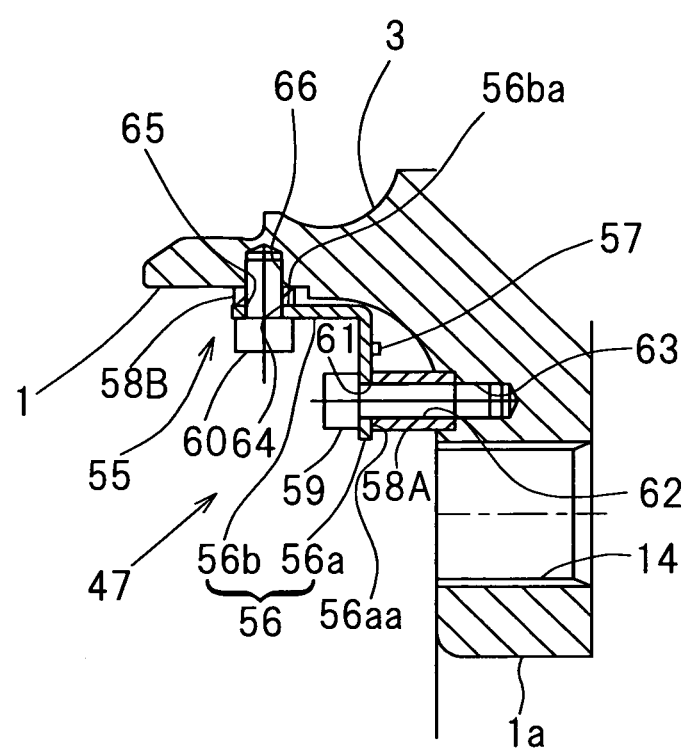
FIG. 25 is a fragmentary enlarged sectional view of FIG. 24.
Figure 26:
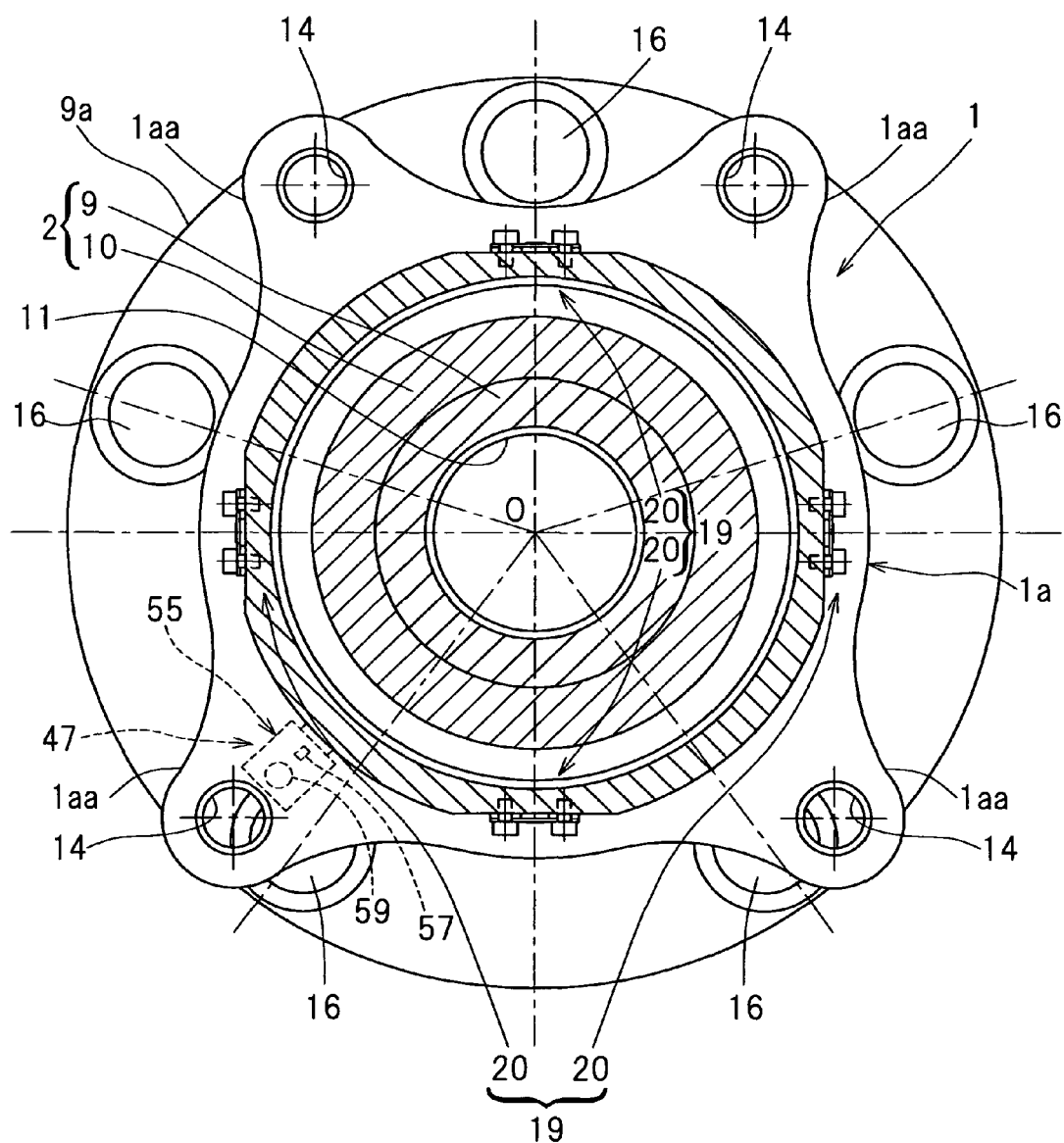
FIG. 26 is a front elevational view showing the outer member employed in the sensor equipped wheel support bearing assembly.

FIGS. 24 to 26 illustrate an eleventh embodiment of the present invention. The sensor equipped wheel support bearing assembly according to this eleventh embodiment is similar to that shown in and described with reference to FIGS. 15 to 18 in connection with the seventh embodiment of the present invention, but differs therefrom in that a direction determining sensor 47 for determining the direction of the axially oriented load Fy estimated by the estimating section 30, is employed. This direction determining sensor 47 is also similar to that that has been previously referred to in connection with the sixth embodiment and, therefore, the details thereof are not reiterated as the description of the direction determining sensor 37 made in connection with the previously described sixth embodiment equally applies here.

In particular, FIG. 25 corresponds to FIG. 13 employed in describing the sixth embodiment and the description made with reference to FIG. 13 equally applies to FIG. 15 and, therefore, the details thereof are not reiterated. In any event, however, unlike the previously described sixth embodiment, the strain generating member 56 employed in the practice of the eleventh embodiment is fastened to the outer peripheral portion of the outer member 1 through respective spacers 58A and 58B by means of bolts 59 and 60. In other words, the bolt 59 inserted through the bolt insertion hole 61, defined in the radial piece 56a, and then through a bolt insertion hole 62, defined in the spacer 58A, is threaded into a screw hole 63 defined in a portion of the flange 1a of the outer member 1 in the vicinity of the vehicle body fitting screw hole 14. Also, the bolt 60 inserted through the bolt insertion hole 64, defined in the axial piece 56b, and then through a bolt insertion hole 65 defined in the spacer 58B, is threaded into a screw hole 66 defined in the outer diametric surface of the outer member 1. By so doing, the strain generating member 56 is fixed to the outer member 1.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer member
1a . . . Vehicle body fitting flange
2 . . . Inner member
3, 4 . . . Rolling surface
5 . . . Rolling element
20 . . . Sensor unit
21 . . . Strain generating member
21a . . . Contact fixing segment
21b . . . Cutout portion
22 . . . Strain sensor
30 . . . Estimating section
31 . . . Correcting section
33 . . . Averaging section
34 . . . Temperature correcting section
47 . . . Direction determining sensor (Axially oriented load direction determining device)
56 . . . Strain generating member

What is claimed is:

1. A sensor equipped wheel support bearing assembly for rotatably supporting a vehicle wheel relative to a vehicle body structure, comprising:
an outer member having an inner periphery formed with a plurality of rolling surfaces;

an inner member having an outer periphery formed with rolling surfaces held in face-to-face relation with the respective rolling surfaces;

a plurality of rows of rolling elements interposed between the opposed rolling surfaces;

at least one sensor unit including a strain generating member, having two or more contact fixing segments adapted to be held in contact with and fixed to one of the outer and inner members that serves as a stationary member, and a sensor mounted on the strain generating member for detecting a strain occurred in the strain generating member;

a correcting section to correct an output signal of the sensor in the sensor unit; and an estimating section to estimate a load, acting on a tire tread of a vehicle wheel tire, or a load, acting on the wheel support bearing assembly, from the output signal which has been corrected by the correcting section, wherein the strain generating member is disposed at a location departing from a line that passes through a center of the rolling elements and extends in a direction defined by a rolling element contact angle and, wherein the strain generating member in the sensor unit is in the form of a thin plate of a generally strip shape when viewed from top, and has a cutout portion defined in a side edge portion thereof.

2. The sensor equipped wheel support bearing assembly as claimed in claim 1, wherein the stationary member is the outer member.

3. The sensor equipped wheel support bearing assembly as claimed in claim 1, wherein the strain generating member in the sensor unit is axially disposed at a position axially intermediate between the plurality of rows of the rolling elements.

4. The sensor equipped wheel support bearing assembly as claimed in claim 1, wherein a plurality of the sensor units are provided.

5. The sensor equipped wheel support bearing assembly as claimed in claim 4, wherein the sensor units are disposed at upper, lower, right and left surface areas of the outer diametric surface of the stationary member, which correspond respectively to top, bottom, forward and rearward positions relative to a tire tread of a vehicle wheel tire.

6. The sensor equipped wheel support bearing assembly as claimed in claim 1, wherein the strain generating member in the sensor unit is of a kind unable to undergo a plastic deformation even under a condition, in which as an external force acting on the stationary member or a working force acting between a vehicle wheel tire and a road surface, the expected maximum force is applied.

7. The sensor equipped wheel support bearing assembly as claimed in claim 1, further comprising a rolling element position detecting device provided in the stationary member for detecting a position of the rolling elements, wherein correcting section is in the form of a section that corrects the output signal of the sensor in the sensor unit in dependence on a detection output of the rolling element position detecting device.

8. The sensor equipped wheel support bearing assembly as claimed in claim 1, further comprising an axially oriented load direction determining device for determining a direction of an axially oriented load acting in a direction axially of the wheel support bearing assembly or a vehicle wheel tire, the axially oriented load direction determining device including an L-shaped strain generating member having two pieces, one of the pieces being fitted to a stationary side raceway ring and the other being fitted to a flange of the stationary side raceway ring, and a sensor fitted to this strain generating member for detecting a strain induced in this strain generating member.

9. The sensor equipped wheel support bearing assembly as claimed in claim 1, wherein the strain generating member in the sensor unit is axially arranged at a position on an inboard side of one of the plurality of the rows of the rolling elements that lies on the inboard side.

10. The sensor equipped wheel support bearing assembly as claimed in claim 9, wherein three or more of the sensor units are provided and further comprising an estimating section for estimating from respective output signals of the sensors in those sensor units, a radially oriented load, acting in a direction radially of the wheel support bearing assembly or the vehicle wheel tire, or an axially oriented load acting in a direction axially of the wheel support bearing assembly or the vehicle wheel tire.

* * * * *